US010027909B2

(12) United States Patent
Hayashi et al.

(10) Patent No.: US 10,027,909 B2
(45) Date of Patent: Jul. 17, 2018

(54) IMAGING DEVICE, IMAGING METHOD, AND IMAGE PROCESSING DEVICE

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/704,941

(22) Filed: Sep. 14, 2017

(65) Prior Publication Data
US 2018/0007292 A1 Jan. 4, 2018

Related U.S. Application Data

(60) Division of application No. 14/987,435, filed on Jan. 4, 2016, now Pat. No. 9,794,500, which is a
(Continued)

(30) Foreign Application Priority Data

Aug. 1, 2013 (JP) ................................. 2013-160768

(51) Int. Cl.
H04N 5/357 (2011.01)
G06T 5/00 (2006.01)
(Continued)

(52) U.S. Cl.
CPC ............ H04N 5/357 (2013.01); G06T 5/001 (2013.01); G06T 5/003 (2013.01); G06T 5/10 (2013.01);
(Continued)

(58) Field of Classification Search
CPC ...... H04N 9/646; H04N 5/208; H04N 5/2254; H04N 5/3572; H04N 5/23229; G06T 7/20; G06T 5/30; G06T 5/003; G06K 9/44

See application file for complete search history.

(56) References Cited

U.S. PATENT DOCUMENTS 5,790,709 A 8/1998 Kopeika et al.
2004/0036800 A1* 2/2004 Ohki ....................... H04N 19/30
348/459
(Continued)

FOREIGN PATENT DOCUMENTS

JP 2009-260622 A 11/2009
JP 2011-217274 A 10/2011

OTHER PUBLICATIONS

Corrected Notice of Allowance issued in copending U.S. Appl. No. 14/987,435 dated Aug. 17, 2017 (4 pages).
(Continued)

Primary Examiner — Timothy J Henn
(74) Attorney, Agent, or Firm — Birch, Stewart, Kolasch & Birch, LLP

(57) ABSTRACT

An imaging device 10 according to one aspect of the present invention includes: a subject distance acquisition section 115; a movement amount acquisition section 120 that acquires an amount of movement of the subject on the basis of the subject distance; a restoration processing determination section 125 that determines, on the basis of the amount of movement acquired by the movement amount acquisition section 120, whether the restoration processing should be performed on the images through a restoration filter, a restoration strength of the restoration processing should be adjusted and the restoration processing should be performed on the images, or the restoration processing should not be performed on the images; and a restoration processing
(Continued)

execution section 105 that performs the restoration processing on the images through the restoration filter or with the adjusted restoration strength, on the basis of the determination of the restoration processing determination section 125.

2 Claims, 22 Drawing Sheets

Related U.S. Application Data continuation of application No. PCT/JP2014/067106, filed on Jun. 27, 2014.

(51) Int. Cl.
*G06T 5/10* (2006.01)
*G06T 5/20* (2006.01)
*H04N 5/232* (2006.01)

(52) U.S. Cl.
CPC ............ *G06T 5/20* (2013.01); *H04N 5/23212* (2013.01); *H04N 5/23229* (2013.01); *G06T 2207/10016* (2013.01); *G06T 2207/20201* (2013.01)

(56) References Cited

U.S. PATENT DOCUMENTS

| | | |
|---|---|---|
| 2006/0291841 A1 | 12/2006 | Fukumoto et al. |
| 2010/0053350 A1* | 3/2010 | Miyauchi ............ G02B 27/0075 348/222.1 |
| 2011/0285879 A1 | 11/2011 | Hatakeyama |
| 2013/0057714 A1 | 3/2013 | Ishii et al. |
| 2014/0218557 A1 | 8/2014 | Ebe |
| 2016/0140697 A1 | 5/2016 | Sugimoto et al. |

OTHER PUBLICATIONS

International Search Report, issued in PCT/JP2014/067106, dated Sep. 16, 2014.
Non-Final Office Action issued in copending U.S. Appl. No. 14/987,435 dated Mar. 24, 2017 (13 pages).
Notice of Allowance issued in copending U.S. Appl. No. 14/987,435 dated Jul. 13, 2017 (10 pages).
Restriction Requirement issued in copending U.S. Appl. No. 14/987,435 dated Jan. 13, 2017 (6 pages).
Written Opinion of the International Searching Authority, issued in PCT/JP2014/067106, dated Sep. 16, 2014.

* cited by examiner

IMAGING DEVICE, IMAGING METHOD, AND IMAGE PROCESSING DEVICE

CROSS-REFERENCE TO RELATED APPLICATIONS

This application is a Divisional of application Ser. No. 14/987,435 filed on Jan. 4, 2016, which is a Continuation of PCT International Application No. PCT/JP2014/067106 filed on Jun. 27, 2014, which claims priority under 35 U.S.C § 119(a) to Patent Application No. 2013-160768 filed in Japan on Aug. 1, 2013, the entire contents of which are hereby expressly incorporated by reference into the present application.

BACKGROUND OF THE INVENTION

1. Field of the Invention

The present invention relates to an imaging device, an imaging method, and an image processing device. In particular, the present invention relates to an imaging device, an imaging method, and an image processing device capable of performing restoration processing based on a point spread function.

2. Description of the Related Art

On an image of a subject photographed through an optical system, sometimes, a so-called point spread phenomenon may be observed. The point spread phenomenon is a phenomenon that a point subject is slightly enlarged by an effect such as aberration or diffraction caused by the optical system. A function, which indicates a response to a point light source of the optical system, is referred to as a point spread function (PSF). This function is known as a parameter having an influence on resolution degradation (blurring) of a photographed image.

A photographed image, of which image quality is lowered due to the point spread phenomenon, is subjected to restoration processing (point image restoration processing) based on the PSF, and thereby image quality of the image can be restored. The restoration processing is processing of acquiring degradation characteristics (point image characteristics), which are caused by aberration and the like of the lens (optical system), in advance and canceling out the point spread of the photographed image through image processing using a restoration filter corresponding to the point image characteristics.

There have been proposed various techniques of the restoration processing. For example, JP2009-260622A discloses an imaging device capable of performing processing of recovering a photographed image without degradation in image quality. The imaging device determines a reliability of a point image spread function (point spread function), and performs image recovery processing on the basis of a result of the determination of the reliability.

JP2011-217274A discloses an image recovery device for improving an accuracy of image recovery when a subject distance cannot be obtained from an auto focus mechanism. This image recovery device estimates a subject distance, calculates a recovery filter on the basis of the estimation result, and recovers image data by using the calculated recovery filter.

SUMMARY OF THE INVENTION

The above-mentioned restoration processing is processing of restoring a blurred image, which is blurred due to a point spread phenomenon (imaging optical characteristics) of an optical system as one of optical characteristics, to an original sharp image. The processing is a technique of acquiring a recovery image, in which degradation in image quality is eliminated, by applying a restoration filter based on the point spread function to data of an original image of which an image quality is degraded.

Hence, degradation in image quality caused by the point spread phenomenon of the optical system is accurately detected, and the restoration filter capable of accurately eliminating the degradation in image quality is designed. When the degradation in image quality caused by the point spread phenomenon of the optical system is accurately reflected in the original image data, in principle, it is possible to obtain "a high-quality image in which a subject image is reproduced with high fidelity" from "a photographed image of which an image quality is degraded".

Accordingly, in order to obtain a recovery image in which a subject image is reproduced with high fidelity, it is necessary for "a property of the restoration filter" used in the restoration processing to be appropriate for "degradation in image quality of the original image data caused by the point spread phenomenon".

However, in accordance with a subject image or characteristics of photographing apparatuses, "the property of the restoration filter" may be inappropriate for "the degradation in image quality of the original image data".

For example, in moving image photography, photography conditions such as a subject distance may change due to a subject or a camera which is moving in the process of photography, and a focused state at an in-focus position may change, and thus the image may be defocused. Even in such a defocused state, when an auto focus function is active, the focused state is automatically recovered, and photography of a moving image, in which a main subject is in focus, can be continued.

However, a time period is necessary for automatic recovery from "a defocused state caused by change in the photography conditions such as the subject distance" to "a focused state achieved by the auto focus function". "The time period (recovery processing time period) for the automatic recovery from the defocused state to the focused state" changes in accordance with an auto focus ability for each photographing apparatus, but the image is defocused during the time period. Meanwhile, the moving image is photographed even during the recovery processing time period, and in the restoration processing for "a defocused moving image" which is captured during the time period, "the property of the restoration filter" is inappropriate for "the degradation in image quality of the original image data". When the restoration processing is performed on such a defocused image, degradation in image quality may be caused by overcorrection. Consequently, the image, which is photographed during adjustment from the defocused state to an appropriately focused state, is inappropriate for the restoration processing.

This is the same for a case where an in-focus target subject is determined and a tracking auto focus function (including a continuous auto focus function) of continuously focusing the subject while tracking the subject is active. That is, when a tracking ability or an auto focus speed of a photographing apparatus is not sufficient for the motion of a subject or a camera, "the property of the restoration filter" tends to be inappropriate for "the degradation in image quality of the original image data". In addition, in this case, a moving image, which is photographed during a time period for automatic recovery from "a defocused state caused by motion of the subject or the camera" to "a focused state achieved by the tracking auto focus function", becomes "a defocused moving image". Then, the property of the restoration filter used in the restoration processing for such a "defocused moving image" is inappropriate for degradation in image quality (point spread phenomenon) of the moving image.

As described above, when the restoration processing is performed using the restoration filter which is inappropriate for "the degradation in image quality of the original image data caused by the point spread phenomenon", degradation in image quality is not sufficiently eliminated. In some cases, degradation in image quality may be caused by the restoration processing.

The above-mentioned JP2009-260622A and JP2011-217274A do not describe the above-mentioned problems at all, and also do not disclose and propose effective means for solving the above-mentioned problems.

The present invention has been made in consideration of the above-mentioned situation. An object of the invention is to provide a technique of preventing image quality from being degraded by the restoration processing performed on a defocused image even when an in-focus target subject or a camera moves in the process of photography and the defocused image is photographed and acquired.

According to an aspect of the present invention, there is provided an imaging device including: an imaging section that generates a plurality of successive images of a subject captured through an optical system; a filter acquisition section that acquires a restoration filter generated corresponding to a transfer function for point distribution of the optical system; a subject distance acquisition section that acquires subject distances of the subject in the images which are generated by the imaging section; a movement amount acquisition section that acquires an amount of movement of the subject in an optical axis direction of the optical system between the plurality of successive images generated by the imaging section, on the basis of the subject distances which are acquired by the subject distance acquisition section; a restoration processing determination section that determines whether the restoration processing should be performed on the images through the restoration filter, a restoration strength of the restoration processing should be adjusted and the restoration processing should be performed on the images, or the restoration processing should not be performed on the images, on the basis of the amount of movement acquired by the movement amount acquisition section; a restoration strength adjustment section that adjusts the restoration strength of the restoration processing when the restoration processing determination section determines that the restoration strength of the restoration processing should be adjusted and the restoration processing should be performed on the images; and a restoration processing execution section that performs the restoration processing on the images through the restoration filter or with the adjusted restoration strength, on the basis of the determination of the restoration processing determination section.

In the present aspect, on the basis of the amount of movement of the subject, it is determined whether or not the restoration strength of the restoration processing should be adjusted or whether or not the restoration processing should be executed, and processing according to the determination result is performed. Hence, even when a defocused image is photographed and acquired with a subject or a camera moving in the process of image photography, the restoration strength of the restoration processing for such a defocused image is adjusted or the restoration processing is not performed, whereby it is possible to effectively prevent image quality from being degraded by the restoration processing.

It should be noted that "the plurality of successive images of the subject captured through the optical system" is a plurality of images which are successively photographed and acquired over time. The images include a recorded moving image which is formed of a plurality of successive frames and stored in a memory, a live view image which is displayed on a display section at the time of photography or around the time of photography, and a plurality of still images which are acquired through successive shutter operations (continuous shooting).

According to another aspect of the present invention, there is provided an imaging device including: an imaging section that generates a plurality of successive images of a subject captured through an optical system; an auto focus section that tracks the subject and performs auto focus control of the optical system; a filter acquisition section that acquires a restoration filter generated corresponding to a transfer function for point distribution of the optical system; a subject distance acquisition section that acquires subject distances of the subject in the images which are generated by the imaging section; a movement amount acquisition section that acquires an amount of movement of the subject in an optical axis direction of the optical system between the plurality of successive images generated by the imaging section, on the basis of the subject distances which are acquired by the subject distance acquisition section; a restoration processing execution section that performs the restoration processing on the images; and a tracking auto focus determination section that determines whether the auto focus control of the optical system tracking the subject should be stopped or continued, on the basis of the amount of movement acquired by the movement amount acquisition section, when the restoration processing execution section performs the restoration processing on the plurality of successive images. The auto focus section performs the auto focus control of the optical system on the subject within focus areas of the images generated by the imaging section, when the tracking auto focus determination section determines that the auto focus control of the optical system tracking the subject should be stopped.

In the present aspect, on the basis of the amount of movement of the subject, it is determined whether or not the auto focus control to track the subject should be continued, and the auto focus control according to the determination result is performed. When the amount of movement of the subject is large, the tracking autofocusing is stopped, and an auto focus control for a subject within a focus area is newly performed. In the auto focus control according to the present aspect, when the amount of movement of the subject is large, the tracking autofocusing is stopped. Thereby, it is possible to prevent photography of a defocused image from being continued.

According to still another aspect of the present invention, there is provided an imaging device including: an imaging section that generates a plurality of successive images of a subject captured through an optical system; a frame rate setting section that sets a frame rate for generation of the images performed by the imaging section; a filter acquisition section that acquires a restoration filter generated corresponding to a transfer function for point distribution of the optical system; a restoration processing determination section that determines whether the restoration processing should be performed on the images through the restoration filter, a restoration strength of the restoration processing should be adjusted and the restoration processing should be performed on the images, or the restoration processing should not be performed on the images, on the basis of the frame rate which is set by the frame rate setting section; a restoration strength adjustment section that adjusts the restoration strength of the restoration processing when the restoration processing determination section determines that the restoration strength of the restoration processing should be adjusted and the restoration processing should be performed on the images; and a restoration processing execution section that performs the restoration processing on the images through the restoration filter or with the adjusted restoration strength, on the basis of the determination of the restoration processing determination section.

In the present aspect, on the basis of the set frame rate, it is determined whether or not the restoration strength of the restoration processing should be adjusted or whether or not the restoration processing should be executed, and processing according to the determination result is performed. Hence, for example, when the frame rate is sufficiently high, it is possible to perform photography appropriate for the motion of the subject for each frame. Thus, the restoration processing, of which the restoration strength is kept constant, may be performed. Further, when the frame rate is not sufficiently high, it is difficult to perform photography appropriate for the motion of the subject for each frame. Thus, the restoration processing, of which the restoration strength is set to be weak, may be performed, or the restoration processing does not have to be performed. Thereby, it is possible to effectively prevent image quality from being degraded by the restoration processing.

Preferably, the imaging device further includes: a restoration processing determination section that determines whether the restoration processing should be performed on the images through the restoration filter, a restoration strength of the restoration processing should be adjusted and the restoration processing should be performed on the images, or the restoration processing should not be performed on the images, on the basis of the amount of movement acquired by the movement amount acquisition section; and a restoration strength adjustment section that adjusts the restoration strength of the restoration processing when the restoration processing determination section determines that the restoration strength of the restoration processing should be adjusted and the restoration processing should be performed on the images. Preferably, the restoration processing execution section performs the restoration processing on the images through the restoration filter or with the adjusted restoration strength, on the basis of the determination of the restoration processing determination section.

In the present aspect, on the basis of the amount of movement, it is determined whether the restoration processing should be performed, the restoration strength of the restoration processing should be adjusted and the restoration processing should be performed on the images, or the restoration processing should not be performed on the images, and then the image processing is performed. Thereby, it is possible to perform the restoration processing appropriate for the amount of movement of the subject.

Preferably, the imaging device further includes a frame rate setting section that sets a frame rate for generation of the images performed by the imaging section. Preferably, the restoration processing determination section determines whether the restoration processing should be performed on the images through the restoration filter, a restoration strength of the restoration processing should be adjusted and the restoration processing should be performed on the images, or the restoration processing should not be performed on the images, on the basis of the frame rate, which is set by the frame rate setting section, and the amount of movement of the subject which is acquired by the movement amount acquisition section.

In the present aspect, on the basis of the set frame rate and the amount of movement of the subject, it is determined whether or not the restoration strength of the restoration processing should be adjusted or whether or not the restoration processing should be executed, and processing according to the determination result is performed. Accordingly, for example, when the frame rate is sufficiently high relative to the amount of movement of the subject, it is possible to perform photography appropriate for the motion of the subject for each frame. Thus, the restoration processing, of which the restoration strength is kept constant, may be performed. Further, when the frame rate is not sufficiently high relative to the amount of movement of the subject, it is difficult to perform photography appropriate for the motion of the subject for each frame. Thus, the restoration processing, of which the restoration strength is set to be weak, may be performed, or the restoration processing does not have to be performed. Thereby, it is possible to effectively prevent image quality from being degraded by the restoration processing.

Preferably, the restoration processing determination section determines that the restoration processing should be performed on the images through the restoration filter when the subject is in focus, and determines that the restoration strength of the restoration processing should be adjusted and the restoration processing should be performed on the images when the subject is out of focus.

In the present aspect, on the basis of whether the subject is in focus or out of focus, it is determined whether or not the restoration strength of the restoration processing should be adjusted. Therefore, it is possible to perform restoration processing appropriate to prevent image quality from being degraded by overcorrection and the like.

Preferably, the restoration processing determination section determines whether the restoration processing should be performed on the images through the restoration filter or the restoration strength of the restoration processing should be adjusted and the restoration processing should be performed on the images, on the basis of the subject distances and the amount of movement of the optical system in the optical axis direction.

In the present aspect, on the basis of the amount of movement of the subject in the optical axis direction and the subject distances, it is determined whether or not the restoration processing should be executed and whether or not the restoration strength of the restoration processing should be adjusted. Therefore, it is possible to further reliably prevent "degradation in image quality caused by the restoration processing" accompanying change in subject distance.

Preferably, the restoration strength adjustment section adjusts the restoration strength of the restoration processing by adjusting a filter coefficient of the restoration filter or adjusting a gain of the restoration processing.

In the present aspect, by adjusting the filter coefficient of the restoration filter or adjusting the gain of the restoration processing, it is possible to appropriately and easily adjust the restoration strength of the restoration processing.

Preferably, the filter acquisition section acquires the restoration filter on the basis of photography conditions for imaging of the subject.

In the present aspect, it is possible to acquire an appropriate restoration filter in which the photography conditions are reflected.

Preferably, the imaging device further includes a blurred image correction processing section. Preferably, the restoration processing determination section determines that blurred image correction processing different from the restoration processing should be performed when determining that the restoration processing should not be performed on the images. Preferably, the blurred image correction processing section performs the blurred image correction processing on the images when the restoration processing determination section determines that the blurred image correction processing should be performed.

In the present aspect, even if the restoration processing is not performed, blurred image correction processing is performed, and image blurring is reduced. As a result, it is possible to obtain a high-definition image. The "blurred image correction processing" described herein is image processing which is not based on the point spread function, and includes various kinds of processing capable of reducing image blurring. For example, the processing may include outline highlighting processing and the like. The outline highlighting processing is, for example, processing of obtaining a sharp image by setting a high gradient of concentration at the outline portion in the image. The processing may include image processing of highlighting high-frequency components of a processing target image.

Preferably, the optical system is an interchangeable type.

In the interchangeable-type optical system according to the present aspect, even when the characteristics of the optical system change, it is possible to perform appropriate restoration processing in which degradation in image quality is suppressed.

Preferably, the imaging device further includes a display section. Preferably, the restoration processing execution section displays, as a live view image, the images on which the restoration processing is performed through the restoration filter or with the adjusted restoration strength, on the display section.

In the present aspect, even in the case of the live view image, it is possible to effectively prevent image quality from being degraded by the restoration processing.

According to still another aspect of the present invention, there is provided an imaging method including: a generation step of generating a plurality of successive images of a subject captured through an optical system; a filter acquisition step of acquiring a restoration filter generated corresponding to a transfer function for point distribution of the optical system; a subject distance acquisition step of acquiring subject distances of the subject in the images which are generated in the generation step; a movement amount acquisition step of acquiring an amount of movement of the subject in an optical axis direction of the optical system between the plurality of successive images generated in the generation step, on the basis of the subject distances which are acquired in the subject distance acquisition step; a restoration processing determination step of determining whether the restoration processing should be performed on the images through the restoration filter, a restoration strength of the restoration processing should be adjusted and the restoration processing should be performed on the images, or the restoration processing should not be performed on the images, on the basis of the amount of movement acquired in the movement amount acquisition step; a restoration strength adjustment step of adjusting the restoration strength of the restoration processing when it is determined in the restoration processing determination step that the restoration strength of the restoration processing should be adjusted and the restoration processing should be performed on the images; and a restoration processing execution step of performing the restoration processing on the images through the restoration filter or with the adjusted restoration strength, on the basis of the determination in the restoration processing determination step.

According to still another aspect of the present invention, there is provided an imaging method including: a generation step of generating a plurality of successive images of a subject captured through an optical system; an auto focus step of tracking the subject and performing auto focus control of the optical system; a filter acquisition step of acquiring a restoration filter generated corresponding to a transfer function for point distribution of the optical system; a subject distance acquisition step of acquiring subject distances of the subject in the images which are generated in the generation step; a movement amount acquisition step of acquiring an amount of movement of the subject in an optical axis direction of the optical system between the plurality of successive images generated in the generation step, on the basis of the subject distances which are acquired in the subject distance acquisition step; a restoration processing execution step of performing the restoration processing on the images; and a tracking auto focus determination step of determining whether the auto focus control of the optical system tracking the subject should be stopped or continued, on the basis of the amount of movement acquired in the movement amount acquisition step, when the restoration processing is performed on the plurality of successive images in the restoration processing execution step, in which in the auto focus step, the auto focus control of the optical system is performed on the subject within focus areas of the images generated in the generation step, when it is determined in the tracking auto focus determination step that the auto focus control of the optical system tracking the subject should be stopped.

According to still another aspect of the present invention, there is provided an imaging method including: a generation step of generating a plurality of successive images of a subject captured through an optical system; a frame rate setting step of setting a frame rate for generation of the images performed in the generation step; a filter acquisition step of acquiring a restoration filter generated corresponding to a transfer function for point distribution of the optical system; a restoration processing determination step of determining whether the restoration processing should be performed on the images through the restoration filter, a restoration strength of the restoration processing should be adjusted and the restoration processing should be performed on the images, or the restoration processing should not be performed on the images, on the basis of the frame rate which is set in the frame rate setting step; a restoration strength adjustment step of adjusting the restoration strength of the restoration processing when it is determined in the restoration processing determination step that the restoration strength of the restoration processing should be adjusted and the restoration processing should be performed on the images; and a restoration processing execution step of performing the restoration processing on the images through the restoration filter or with the adjusted restoration strength, on the basis of the determination in the restoration processing determination step.

According to still another aspect of the present invention, there is provided an image processing device including: an image acquisition section that acquires a plurality of successive images of a subject, which are captured through an optical system, from an imaging section; a filter acquisition section that acquires a restoration filter generated corresponding to a transfer function for point distribution of the optical system; a subject distance acquisition section that acquires subject distances of the subject in the images which are acquired from the imaging section; a movement amount acquisition section that acquires an amount of movement of the subject in an optical axis direction of the optical system between the plurality of successive images acquired from the imaging section, on the basis of the subject distances which are acquired by the subject distance acquisition section; a restoration processing determination section that determines whether the restoration processing should be performed on the images through the restoration filter, a restoration strength of the restoration processing should be adjusted and the restoration processing should be performed on the images, or the restoration processing should not be performed on the images, on the basis of the amount of movement acquired by the movement amount acquisition section; a restoration strength adjustment section that adjusts the restoration strength of the restoration processing when the restoration processing determination section determines that the restoration strength of the restoration processing should be adjusted and the restoration processing should be performed on the images; and a restoration processing execution section that performs the restoration processing on the images through the restoration filter or with the adjusted restoration strength, on the basis of the determination of the restoration processing determination section. Preferably, the subject distance acquisition section acquires the subject distances, which are recorded in image data, from the image data.

In the present aspect, on the basis of the set frame rate or the amount of movement of the subject, it is determined whether or not the restoration strength of the restoration processing should be adjusted, whether or not the restoration processing should be executed, or whether or not the tracking auto focus control should be executed, and processing according to the determination result is performed. Thus, it is possible to effectively prevent image quality from being degraded by the restoration processing.

DESCRIPTION OF THE PREFERRED EMBODIMENTS

Referring to accompanying drawings, embodiments of the present invention will be described. In the following embodiments, a description will be given of an example, in which the present invention is applied to a digital camera 10 (imaging device) connectable to a computer (PC: personal computer).

In the following example, an interchangeable-lens digital camera 10, in which an optical system 12 and a camera main body 14 separately formed are assembled, will be described. However, the same image restoration processing can be performed on even a fixed-lens digital camera 10 having the optical system 12 and the camera main body 14 integrated as one body. Further, the digital camera 10 may be a video camera which has a main function of moving image photography, and may be an imaging device capable of photographing both a still image and a moving image.

Figure 1:
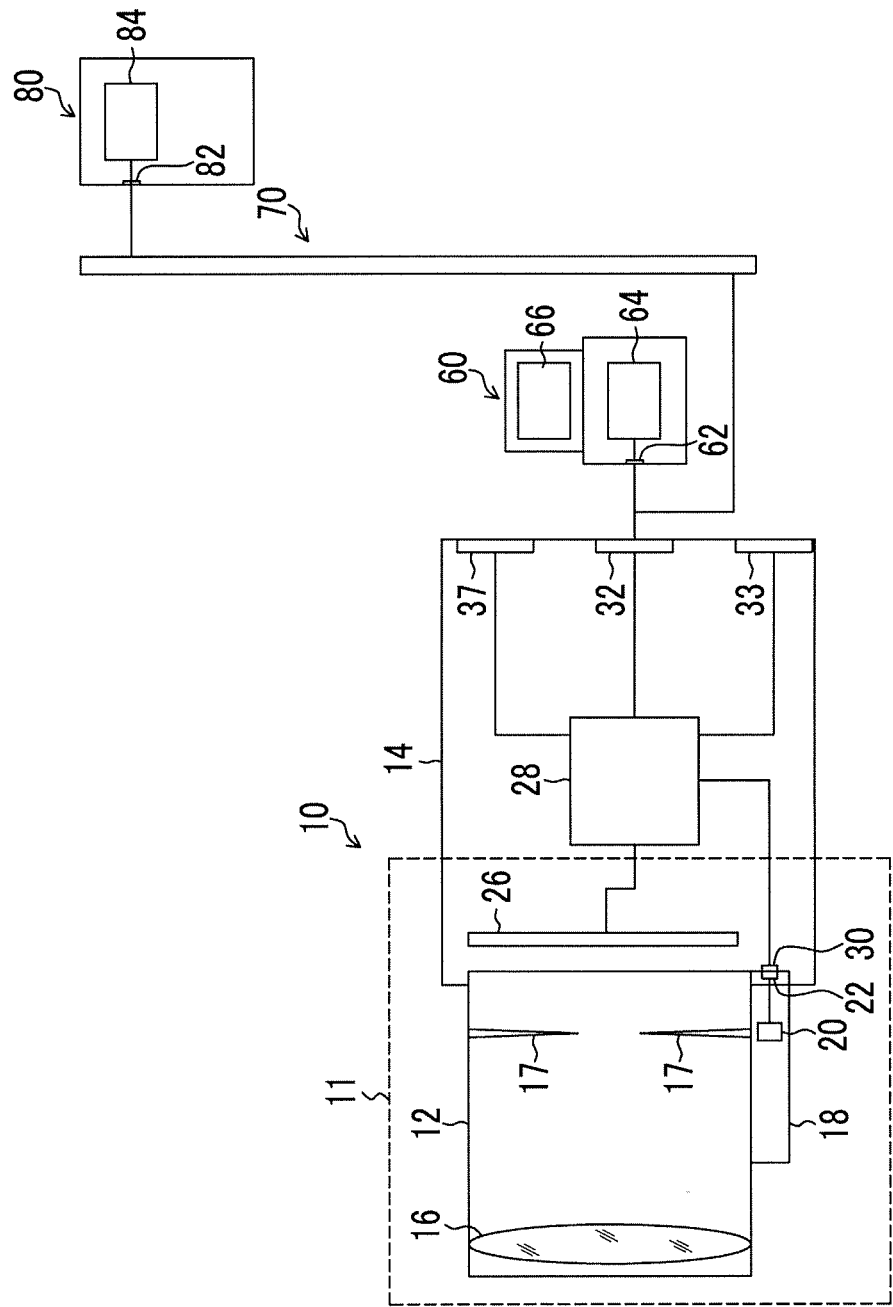
FIG. 1 is a block diagram illustrating a brief overview of a digital camera which is connected to a computer.

FIG. 1 is a block diagram illustrating a brief overview of the digital camera connected to the computer.

The digital camera 10 includes the interchangeable optical system 12, and the camera main body 14 having an imaging element 26. The digital camera 10 is electrically connected to the optical system 12 and the camera main body 14 through an optical system input/output section 22 of the optical system 12 and a camera main body input/output section 30 of the camera main body 14.

The optical system 12 includes optical members such as a lens 16 and an aperture stop 17 and an optical system operation section 18 that controls the optical members. The optical system operation section 18 includes: an optical system controller 20 that is connected to the optical system input/output section 22; and an actuator (not shown in the drawing) that operates the optical members. The optical system controller 20 controls the optical members through the actuator on the basis of a control signal which is sent from the camera main body 14 through the optical system input/output section 22, and performs, for example, focus control and zoom control based on lens movement and aperture amount control of the aperture stop 17.

Accordingly, an imaging section 11 of the digital camera 10 includes the optical system 12 and the imaging element 26. The imaging element 26 generates a plurality of successive images of the subject captured through the optical system 12 (which includes a recorded moving image, a live view image, successively photographed images in a continuous shooting mode, and the like, and which is simply referred to as "successive images").

In the imaging device 10, recording of a moving image is started when a video imaging mode is selected as the photography mode through a user interface 37 and the shutter button (not shown in the drawing) included in the user interface 37 is "pressed fully", and the recording stops and remains on standby when the shutter button is "pressed fully" again.

When the video imaging mode is selected, an auto focus control section (not shown in the drawing) included in a device control section 34 continuously performs focus adjustment through the optical system controller 20, and an automatic exposure control section (not shown in the drawing) included in the device control section 34 performs automatic exposure control (AE). In addition, as the auto focus adjustment (AF) performed by the auto focus control section, it is possible to use heretofore known modes such as a phase difference AF mode and a contrast AF mode.

In contrast, in the imaging device 10, a photography preparation operation to perform AF/AE control is started when a still image photography mode is selected as the photography mode and the shutter button is "pressed halfway", and image capturing and recording of a still image are performed when the shutter button is "pressed fully".

For example, in some mobile imaging devices such as a portable imaging device like a smartphone to be described later, the photography preparation instruction section and the image recording instruction section are not limited to a stroke-type switch that operates in a manner of having two steps which are "pressing halfway" and "pressing fully" like the shutter button. Each instruction section may be a section that has a function of receiving the photography preparation instruction or a function of receiving the image recording instruction. In addition, the instruction section may have other buttons, may have another section for receiving touch input operations, and may be configured to receive a photography preparation instruction or an image recording instruction through a sound input, a gaze input, or the like.

The imaging element 26 has a light concentration microlens, color filters of RGB or the like, and an image sensor (a photodiode; a complementary metal oxide semiconductor (CMOS), a charge coupled device (CCD) or the like). The imaging element 26 converts light of the subject image, which is captured by the optical system 12, into an electrical signal, and sends an image signal (original image data) to a camera main body controller 28.

As described above, the imaging element 26 outputs the original image data obtained through photography using the optical system 12, and transmits the original image data to an image processing device of the camera main body controller 28. In addition, the original image data, which is generated by the imaging element 26, includes a plurality of successive images of the subject.

Figure 2:
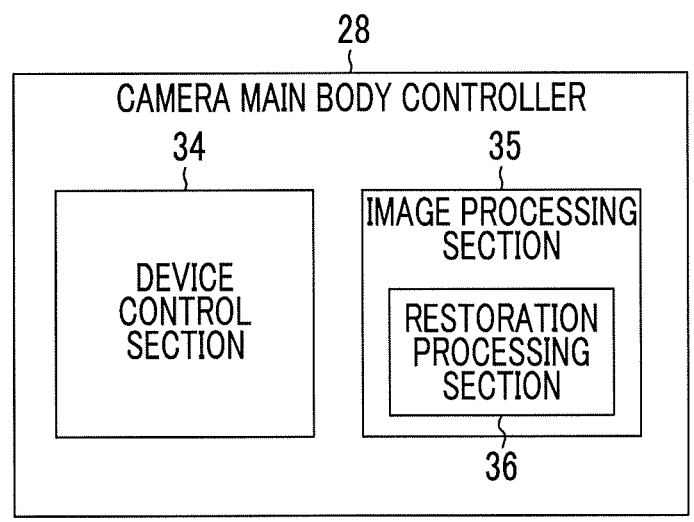
FIG. 2 is a block diagram illustrating a functional configuration example of a camera main body controller.

The camera main body controller 28 integrally controls the camera main body 14, and has the device control section 34 and an image processing section (image processing device) 35, as shown in FIG. 2. The device control section 34 controls, for example, the output of the image signal (image data) sent from the imaging element 26, generates the control signal for controlling the optical system 12, transmits the signal to the optical system 12 (optical system controller 20) through the camera main body input/output section 30, and transmits image data (RAW data, JPEG data, and the like) before and after the image processing to external devices (the computer 60 and the like) connected through an input/output interface 32. Further, the device control section 34 appropriately controls various kinds of devices such as a display section 33 (EVF: electronic view finder, rear-side liquid crystal display section) provided in the digital camera 10.

In contrast, the image processing section 35 performs arbitrary image processing on the image signal which is sent from the imaging element 26, as necessary. For example, the image processing section 35 appropriately performs various kinds of image processing such as sensor correction processing, demosaic (synchronization) processing, pixel interpolation processing, color correction processing (offset correction processing, white balance processing, color matrix processing, gamma conversion processing, and the like), RGB image processing (sharpness processing, tone correction processing, exposure correction processing, outline correction processing, and the like), RGB/YCrCb conversion processing, and image compression processing. In addition, the image processing section 35 of the present example includes a restoration processing section 36 that performs the restoration processing, which is based on the point spread function of the optical system 12, on the image signal (original image data). The restoration processing will be described in detail.

The digital camera 10 shown in FIG. 1 is provided with other members (shutter and the like) necessary for photography and the like. With such a configuration, a user is able to appropriately determine and change various kinds of setting for the photography and the like through the user interface 37 which is provided on the camera main body 14. The user interface 37 is connected to the camera main body controller 28 (the device control section 34 and the image processing section 35), whereby various kinds of setting determined and changed by a user's command is reflected in various kinds of processing in the camera main body controller 28.

The image data, which is subjected to the image processing in the camera main body controller 28, is sent to the computer 60, which is connected to the input/output interface 32, and the like. A format of the image data, which is sent from the digital camera 10 (camera main body controller 28) to the computer 60, is not particularly limited, and may be an arbitrary format such as RAW, JPEG, or TIFF. Consequently, the camera main body controller 28 may associate a plurality of related data pieces with each other so as to form a single image file, and may transmit the image file to the computer 60. The related data pieces include, like so-called Exif (Exchangeable Image File Format), header information (photography information (photography date and time, a device type, the number of pixels, an aperture value, and the like) and the like), main image data, and thumbnail image data, and the like.

The computer 60 is connected to the digital camera 10 through the input/output interface 32 and a computer input/output section 62 of the camera main body 14, and receives various kinds of data such as image data which is sent from the camera main body 14. A computer controller 64 integrally controls the computer 60 such that it performs image processing on the image data sent from the digital camera 10, and performs communication control to communicate with a server 80 which is connected to the computer input/output section 62 through network lines such as the Internet 70. The computer 60 has a display 66, and the display 66 displays processing contents in the computer controller 64 on the display 66 as necessary. A user may control the computer 60 and control devices (the digital camera 10, and the server 80) connected to the computer 60 by operating input means (not shown in the drawing) such as a keyboard and the like while checking a display of the display 66 so as to input data or a command to the computer controller 64.

The server 80 has a server input/output section 82 and a server controller 84. The server input/output section 82 constitutes a connection section for transmission to and reception from external devices such as the computer 60, and is connected to the computer input/output section 62 of the computer 60 through network lines such as the Internet 70. The server controller 84 transmits and receives various kinds of data to and from the computer controller 64 as necessary, and downloads various kinds of data to the computer 60 or performs calculation processing and transmits the calculation results to the computer 60, in cooperation with the computer controller 64 in response to a control instruction signal which is sent from the computer 60.

Each controller (the optical system controller 20, the camera main body controller 28, the computer controller 64, and the server controller 84) includes circuits necessary for control processing. For example, the controllers include a calculation processing circuit (CPU or the like), a memory, and the like. Further, communication between the digital camera 10, the computer 60, and the server 80 may be performed through wired or wireless connection. Furthermore, the computer 60 and the server 80 may be integrally formed, and the computer 60 and/or the server 80 may be omitted. In addition, by making the digital camera 10 have a function of communicating with the server 80, various kinds of data may be directly transmitted and received between the digital camera 10 and the server 80.

Next, the restoration processing of captured image data (image data) of a subject image, which is obtained through the imaging element 26, will be described.

The present example will describe an example in which the restoration processing is performed in the camera main body 14 (camera main body controller 28). However, all or a part of the restoration processing may be performed in another controller (the optical system controller 20, the computer controller 64, the server controller 84, or the like).

The restoration processing is processing of acquiring restored image data by performing the restoration processing on the original image data, which is acquired through photography using the optical system 12 from the imaging element 26, through the restoration filter based on the point spread function of the optical system.

Figure 3:
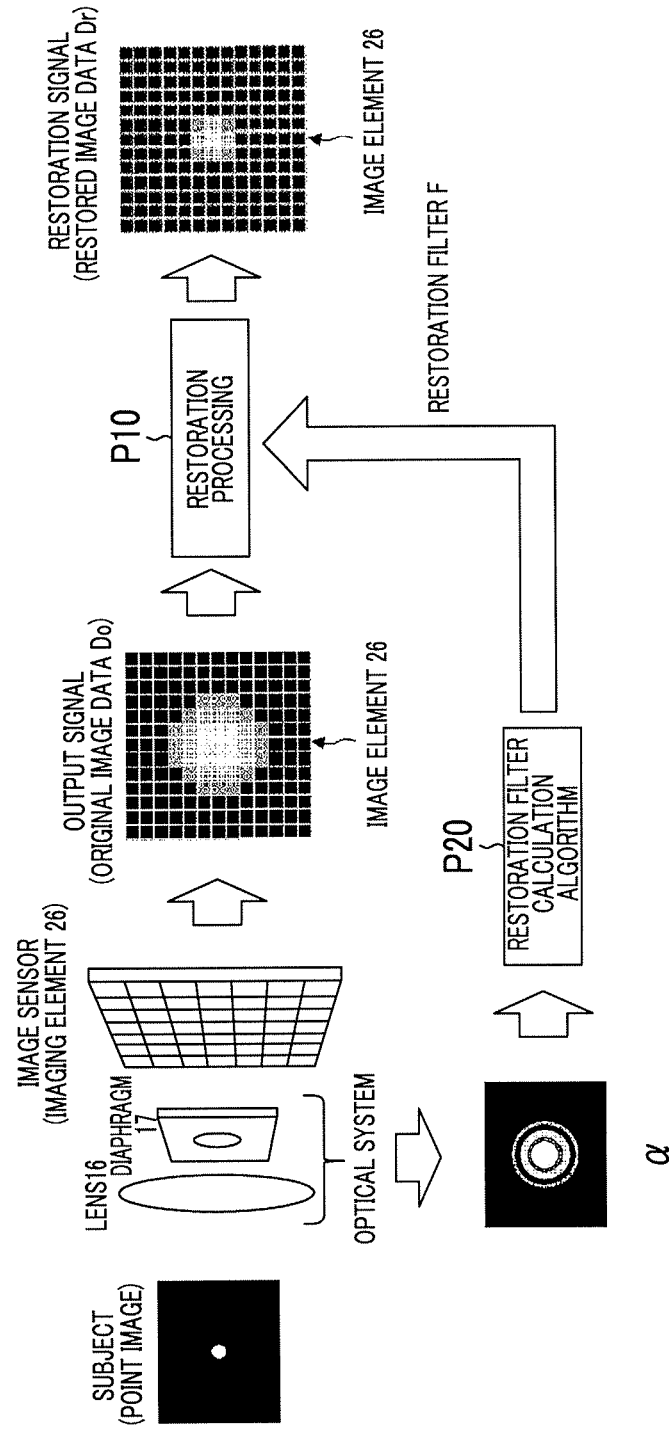
FIG. 3 is a diagram illustrating a brief overview from image photography to restoration processing.

FIG. 3 is a diagram illustrating a brief overview from the image photography to the restoration processing. When the point image is photographed as a subject, the imaging element 26 (image sensor) receives the subject image through the optical system 12, and the imaging element 26 outputs the original image data Do. The original image data Do is image data of an original subject image which is blurred due to the point spread phenomenon caused by characteristics of the optical system.

The original subject image (point image) is restored from the original image data Do of the blurred image. Accordingly, by performing restoration processing P10 on the original image data Do through a restoration filter F, it is possible to obtain restored image data Dr which indicates an image (restored image) closer to the original subject image (point image).

The restoration filter F used in the restoration processing P10 can be obtained using a predetermined restoration filter calculation algorithm P20 from point image information (point spread function) of the optical system corresponding to the photography conditions at the time of acquiring the original image data Do. The reference sign α in FIG. 3 indicates the point image information corresponding to the photography conditions. The point spread function as point image information of the optical system, changes depending on not only a type of the lens 16 but also various photography conditions such as an aperture value, a focal length, a zoom ratio, an image height, the number of recorded pixels, and a pixel pitch. Accordingly, in order to calculate the restoration filter F, such photography conditions are acquired.

Figure 4:
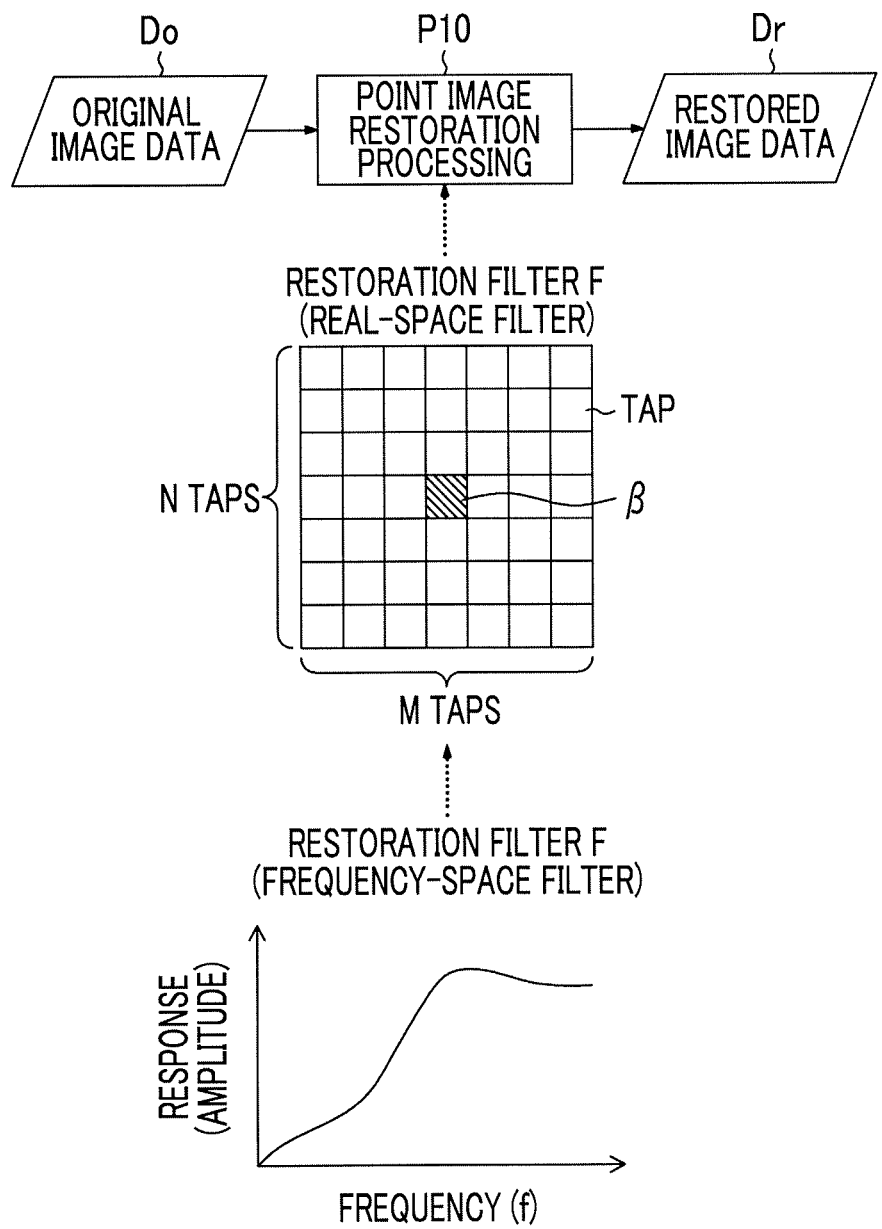
FIG. 4 is a block diagram illustrating a brief overview of an example of the restoration processing.

FIG. 4 is a diagram illustrating a brief overview of an example of the restoration processing.

As described above, the restoration processing P10 is processing of creating the restored image data Dr from the original image data Do through filtering processing using the restoration filter F. For example, the real-space restoration filter F, which is formed of taps of N×M (N and M are integers equal to or greater than 2), is applied to the image data as a processing target. Thereby, by performing weighted average calculation (deconvolution calculation) on the pixel data (processing target pixel data of the original image data Do and adjacent-pixel data) which is allocated in each tap, it is possible to calculate the pixel data (restored image data Dr) subjected to the restoration processing. By sequentially applying the weighted average processing using the restoration filter F to data pieces of all pixels constituting the image data instead of the target pixels, it is possible to perform the restoration processing. The reference sign β in FIG. 4 indicates a tap (filter coefficient) applied to the processing target pixel data.

The real-space restoration filter formed of the N×M taps can be derived by performing inverse Fourier transform on a frequency-space restoration filter. Consequently, the real-space restoration filter can be appropriately calculated by specifying the frequency-space restoration filter as a reference and designating the number of taps constituting the real-space restoration filter.

The above-mentioned restoration processing can be performed on a plurality of successively photographed images (successive images). When the restoration processing is performed on the successive images, the restoration processing is performed on each (each frame) of a plurality of images constituting the successive images.

As the original image data on which the restoration processing is performed, it is possible to use image data of each color of RGB or a luminance signal (Y data) which can be obtained through RGB/YCrCb conversion from the image data of each color of RGB.

A timing of performing the restoration processing is not particularly limited. The restoration processing may be performed on the luminance signal (Y data) obtained from the image data (RGB data), which is obtained after demosaic processing, as the original image data. In addition, the restoration processing may be performed on "image data (mosaic image data) obtained before the demosaic processing" or "image data (demosaic image data) obtained before luminance signal conversion processing after the demosaic processing".

First Embodiment

The present embodiment will describe an example where image quality is prevented from being degraded by overcorrection and the like, which are caused by the restoration processing performed on the defocused image, by controlling the restoration processing on the basis of "the amount of movement of the subject" in the optical axis direction of the optical system 12.

Figure 5:
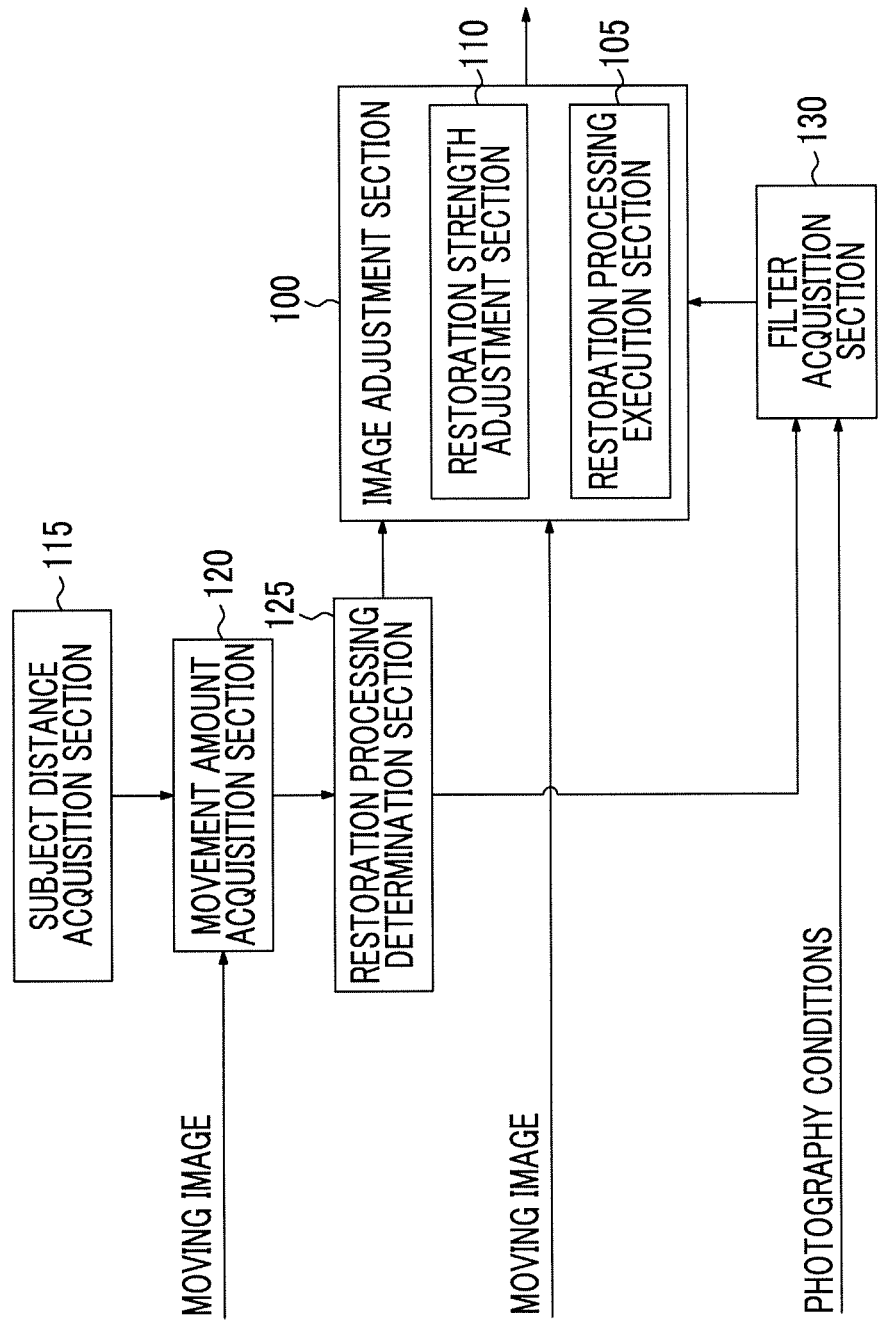
FIG. 5 is a functional block diagram illustrating restoration processing of a first embodiment.

FIG. 5 is a functional block diagram illustrating the restoration processing of a first embodiment, and shows various functional blocks constituting the image processing section 35 (refer to FIG. 2). It should be noted that the functional blocks in the drawing are not necessarily separately provided and the plurality of functional blocks may be implemented by hardware and/or software incorporated therein.

The image processing section 35 includes an image adjustment section 100, a subject distance acquisition section 115, a movement amount acquisition section 120, a restoration processing determination section 125, and a filter acquisition section 130. The image adjustment section 100 includes a restoration strength adjustment section 110 and a restoration processing execution section 105.

The subject distance acquisition section 115 acquires subject distances of a subject (main subject) in images which are generated by the imaging element 26 of the imaging section 11, and sends information on the subject distances to the movement amount acquisition section 120. A technique of acquiring the subject distances is not particularly limited, and various techniques may be used. For example, the subject distance acquisition section 115 may acquire subject distances that are directly measured by a distance-measuring sensor which is not shown in the drawing, and may calculate and indirectly acquire the subject distances from a position of a focus lens or the like (a driving pulse of the focus lens or the like).

The movement amount acquisition section 120 acquires an amount of movement of a subject (main subject) between successive images, particularly, an amount of movement of the subject in the optical axis direction of the optical system, on the basis of the subject distances which are sent from the subject distance acquisition section 115. That is, the movement amount acquisition section 120 acquires information on how much the subject moves in the optical axis direction between the successive images, on the basis of the subject distances, which are acquired by the subject distance acquisition section 115, and a plurality of images (successive images) which are successively acquired from the imaging section 11 (imaging element 26).

Figure 6:
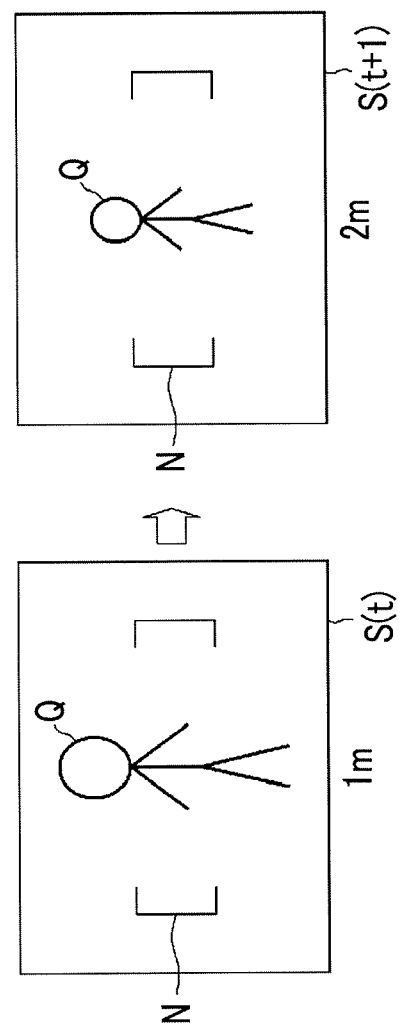
FIG. 6 is a diagram illustrating an example in which a movement amount acquisition section acquires an amount of movement of a subject.
Figure 7:
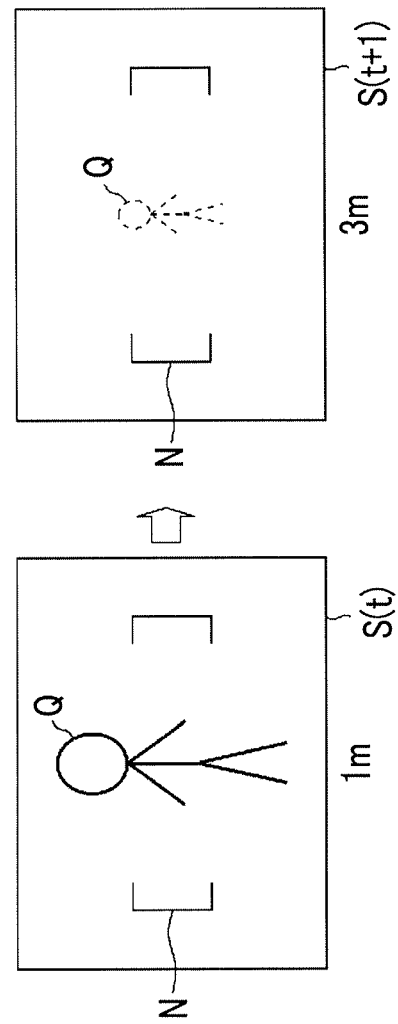
FIG. 7 is a diagram illustrating an example in which the movement amount acquisition section acquires the amount of movement of the subject.

FIGS. 6 and 7 are diagrams illustrating examples in which the movement amount acquisition section 120 acquires the amount of movement of the subject. FIG. 6 shows two successively acquired images of an image S(t) and an image S(t+1), where the successive images are focused. In contrast, FIG. 7 shows two successively acquired images of an image S(t) and an image S(t+1), where the image S(t) is focused and the image S(t+1) is defocused.

In the example shown in FIG. 6, the image (single frame) S(t), which is photographed at a time (t), is acquired under conditions in which the subject distance to a subject Q (main subject) is 1 m, and the image S(t+1), which is photographed at a time (t+1), is acquired under conditions in which the subject distance to the subject Q is 2 m. Consequently, in the present example, the subject Q moves by 1 m in the optical axis direction of the optical system between the successive images (frames). Thus, the movement amount acquisition section 120 acquires information that the amount of movement of the subject Q between the successive images S(t) and S(t+1) is 1 m.

In contrast, in the example shown in FIG. 7, the image S(t), which is photographed at a time (t), is acquired under conditions in which the subject distance to the subject Q is 1 m, and the image S(t+1), which is photographed at a time (t+1), is acquired under conditions in which the subject distance to the subject Q is 3 m. Consequently, in the present example, the subject Q moves by 2 m in the optical axis direction of the optical system between the successive images (frames). Thus, the movement amount acquisition section 120 acquires information that the amount of movement of the subject Q between the successive images S(t) and S(t+1) is 2 m.

Figure 8:
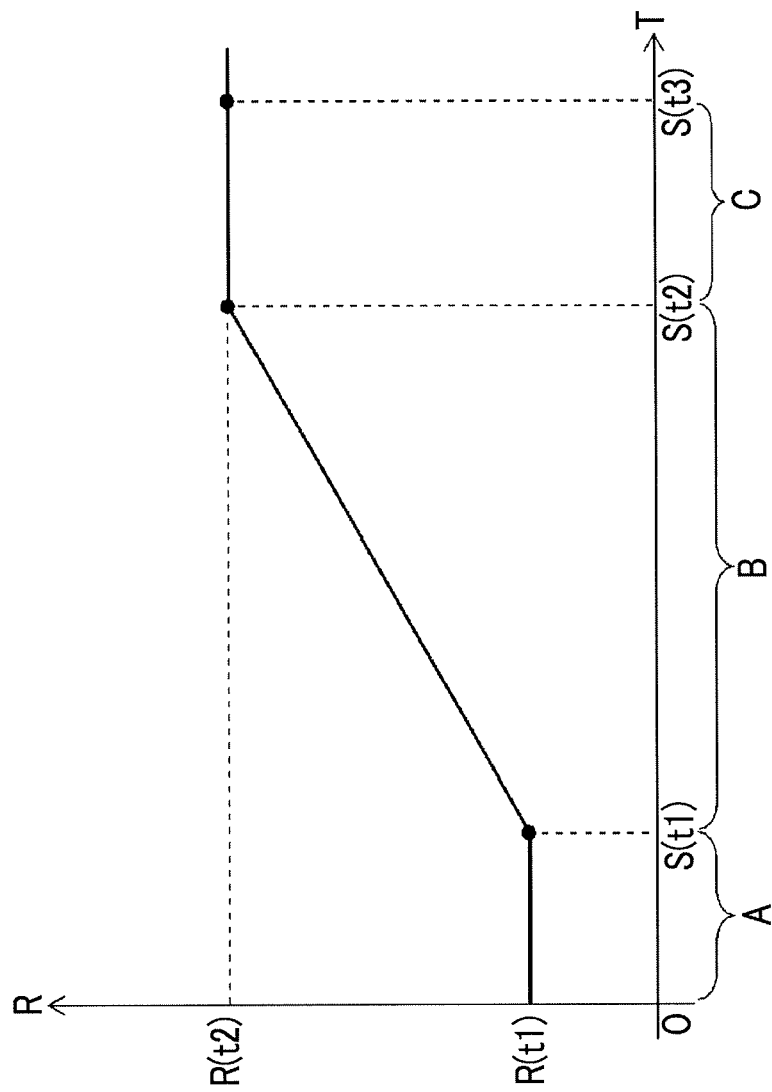
FIG. 8 is a graph illustrating an example of change in amount of movement of a subject Q, where the horizontal axis indicates a time period T, and the vertical axis indicates a subject distance R.

FIG. 8 is a graph illustrating an example of change in amount of movement of the subject Q, where the horizontal axis indicates a time period T, and the vertical axis indicates a subject distance R. In the present example, the subject distance is constant in the time period from "0" to "S(t1)" (refer to "R(t1)" of FIG. 8), and a relative distance between the subject Q and the digital camera 10 is constant without change. Then, in the time period from "S(t1)" to "S(t2)", the subject distance increases proportionally (refer to "R(t1)" and "R(t2)" of FIG. 8), and the subject is moving at a constant speed in the optical axis direction (depth direction). Subsequently, the subject distance is constant in the time period from the time "S(t2)" to "S(t3)" (refer to "R(t2)" of FIG. 8), and the relative distance between the subject Q and the digital camera 10 is constant without change.

Figure 9:
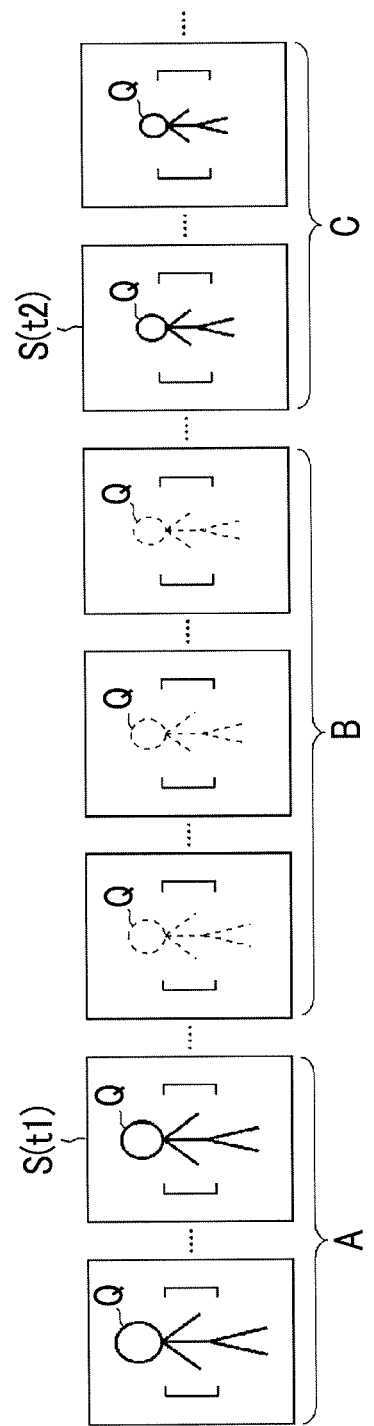
FIG. 9 is a diagram illustrating an example of successively photographed images (frames), and schematically shows images, in which a subject moving in the optical axis direction is photographed, in terms of a relationship between "the time period and the subject distance" shown in FIG. 8.

FIG. 9 is a diagram illustrating an example of successively photographed images (frames), and schematically shows images, in which a subject moving in the optical axis direction is photographed, in terms of a relationship between "the time period and the subject distance" shown in FIG. 8. In FIG. 9, for convenience of description, the plurality of successive images is represented by a number of frames smaller than the actual number of frames. Further, in each frame of FIG. 9, images of the subject Q indicated by the solid line are captured in an in-focus state (refer to "A" and "C" of FIG. 9), and images of the subject Q indicated by the dotted line are captured in an out-of-focus state (defocused state) (refer to "B" of FIG. 9).

"A" of FIG. 9 shows a group of frames which are captured in the time period from "0" to "S(t1)". As described above, in the time period from "0" to "S(t1)", the subject distance R(t1) is constant, the relative distance between the subject Q and the digital camera 10 does not change, and the amount of movement of the subject Q is "0".

"B" of FIG. 9 shows a group of frames which are captured in the time period from "S(t1)" to "S(t2)". As described above, in the time period from "S(t1)" to "S(t2)", the subject Q moves in the optical axis direction (depth direction) at a constant speed from the subject distance "R(t1)" to the subject distance "R(t2)". As a result, the amount of movement of the subject Q is represented by "S(t2)-S(t1)". Consequently, assuming that the number of frames in the time period from "S(t1)" to "S(t2)" is "E", the amount of movement L of the subject in the optical axis direction between successive frames in this time period is represented by the following expression.

$$L = \{R(t2) - R(t1)\}/E$$

In the group of frames indicated by "B" of FIG. 9, the amount of movement (change in distance) of the subject Q in the optical axis direction is large. Thus, the group of frames are formed of images (frames) in which the subject Q is out of focus.

"C" of FIG. 9 shows a group of frames which are captured in the time period from "S(t2)" to "S(t3)". As described above, in the time period from "S(t2)" to "S(t3)", the subject distance R(t2) becomes constant, the relative distance between the subject Q and the digital camera 10 does not change, and the amount of movement of the subject Q becomes "0".

In the example of FIG. 9, the amount of movement of the subject is acquired on the basis of the subject distances, but the present invention is not limited to this. For example, the amount of movement may be acquired on the basis of change in area of a subject image of the subject Q in the image. Specifically, by performing face detection so as to detect change in area of the face, the amount of movement may be acquired.

The restoration processing determination section 125 (refer to FIG. 5) determines whether "the restoration processing using a general restoration strength should be performed on images (each image is a part of successive images)", "the restoration processing with an adjusted restoration strength should be performed on the images", or "the restoration processing should not be performed on the images", on the basis of the amount of movement of the subject Q in the optical axis direction acquired by the movement amount acquisition section 120. By performing such determination, it is possible to prevent image quality from being degraded by the restoration processing.

As for a specific determination method, the restoration processing determination section 125 has for example a threshold value for the amount of movement of the subject Q, and compares the threshold value for the amount of movement with the amount of movement of the subject Q acquired from the movement amount acquisition section 120, whereby it is possible to perform determination relating to the above-mentioned restoration processing. It should be noted that the threshold value for the amount of movement can be set as a value corresponding to the subject Q, the subject distances, the photography conditions, a camera function, or the like. The threshold value for the amount of movement can be set as, for example, about 50% of the subject distance. Further, the threshold value may be set on the basis of the subject distance, and may be set to be smaller when the subject distance is shorter. For example, the threshold value can be set to 30% of the subject distance in a range of the subject distance of less than 1 m, set to 40% in a range of equal to or greater than 1 m, and set to 50% in a range of equal to or greater than 5 m. Furthermore, the threshold value for the amount of movement may be set as a different value on the basis of an aperture value, and may be set to be smaller when the aperture value is smaller. For example, the threshold value can be set to 30% of the subject distance when the aperture value is less than F4, set to 40% when the aperture value is equal to or greater than F4, and set to 50% when the aperture value is equal to or greater than F11. In addition, the threshold value for the amount of movement may be set to correspond to a correction coefficient according to the aperture value relative to the threshold value which is set on the basis of the subject distance. For example, the threshold value can be set to 0.5 times the set threshold value when the aperture value is less than F4, set to 0.7 times the set threshold value when the aperture value is equal to or greater than F4, and set to 1 times the set threshold value when the aperture value is equal to or greater than F11.

If the amount of movement of the subject Q acquired by the movement amount acquisition section 120 is greater than the threshold value, the restoration processing determination section 125 determines that the restoration processing should not be performed. The reason for this is that, if the amount of movement of the subject Q acquired by the movement amount acquisition section 120 is greater than the threshold value, a photographed image is highly likely to be defocused (refer to FIGS. 7 and 9), and when the restoration processing is performed on the defocused photographed image, degradation in image quality is likely to be caused by overcorrection and the like.

In contrast, if the amount of movement of the subject Q acquired by the movement amount acquisition section 120 is equal to or less than the threshold value, the restoration processing determination section 125 determines that the restoration processing should be performed. The reason for this is that, if the amount of movement of the subject Q acquired by the movement amount acquisition section 120 is equal to or less than the threshold value, a photographed image is highly likely to be focused, and it can be expected that image quality will be improved through the restoration processing performed on the focused photographed image.

In addition, if the amount of movement of the subject Q is greater than the threshold value, the restoration processing determination section 125 may make the restoration strength weaker than that in a general case (the case where the amount of movement of the subject Q is equal to or less than the threshold value) by adjusting the restoration strength of the restoration processing on the basis of the amount of movement of the subject Q. The reason for this is that, if the restoration strength of the restoration processing is excessively strong, degradation in image quality is likely to be caused by overcorrection and the like.

The restoration processing determination section 125 determines whether the restoration processing should be performed on the images with the general restoration strength through a general restoration filter or the restoration strength of the restoration processing should be adjusted and then the restoration processing should be performed on the images, on the basis of both the amount of movement of the subject Q and the subject distance. In the present aspect, on the basis of both the amount of movement of the subject Q and the subject distances, it is determined whether or not the restoration processing should be executed and whether or not the restoration strength of the restoration processing should be adjusted. Therefore, it is possible to further reliably prevent "degradation in image quality caused by the restoration processing" accompanying change in subject distance.

Specifically, even if the amounts of movement of the subject Q are the same, degrees of degradation in image quality caused by the restoration processing are different between a case where the subject distance is large (that is, a case where the subject Q is far from the digital camera 10), and a case where the subject distance is small (that is a case where the subject Q is close to the digital camera 10). Consequently, the restoration processing determination section 125 is able to perform restoration processing more finely by adjusting the restoration processing technique in consideration of the subject distances in addition to the amount of movement of the subject Q.

The filter acquisition section 130 acquires the restoration filter used for the restoration processing, on the basis of the photography conditions and the like. That is, the filter acquisition section 130 acquires the restoration filter, which is generated corresponding to the transfer function (point spread function) for point distribution of the optical system 12, on the basis of the photography conditions. The filter acquisition section 130 is able to acquire the restoration filter through various methods. For example, the filter acquisition section 130 may acquire the restoration filter from the photography conditions. Further, the filter acquisition section 130 may store a plurality of restoration filters in a memory, which is not shown, in advance, and may select and acquire a restoration filter, which is appropriate for the photography conditions, among the plurality of stored restoration filters.

The image adjustment section 100 includes the restoration strength adjustment section 110 and the restoration processing execution section 105. It should be noted that the image adjustment section 100 may have a function other than the restoration strength adjustment section 110 and the restoration processing execution section 105.

The restoration strength adjustment section 110 adjusts the restoration strength of the restoration processing. For example, when the restoration processing determination section 125 determines that the restoration processing should be performed with the adjusted restoration strength, the restoration strength adjustment section 110 adjusts the restoration strength of the restoration processing. The restoration strength adjustment section 110 is able to adjust the restoration strength in various methods. For example, it is possible to adjust the restoration strength by changing the filter coefficient of the restoration filter. The filter coefficient of the restoration filter acquired by the filter acquisition section 130 may be changed on the basis of the amount of movement of the subject Q acquired by the movement amount acquisition section 120.

The restoration processing execution section 105 performs the restoration processing by applying the restoration filter, which is acquired from the filter acquisition section 130, to successive input images (a moving image or the like). In a broad sense, the restoration processing may be defined to include: processing (filter application processing) of applying the restoration filter to the image data; and processing of adjusting an amplification ratio (restoration gain) of a difference between the original image data and the image data (restored image data) to which the restoration filter is applied.

Figure 10:
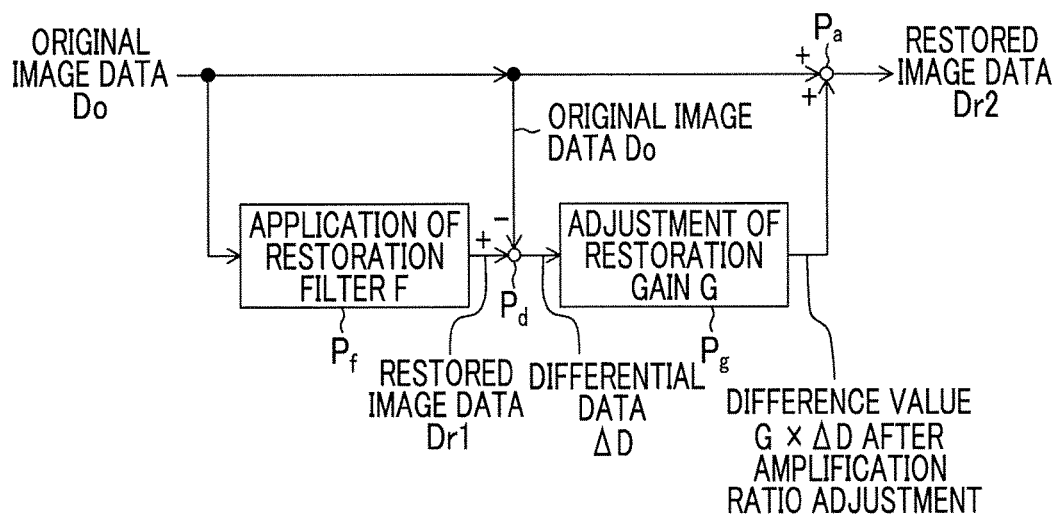
FIG. 10 is a control block diagram illustrating an example of the restoration processing in an image adjustment section (a restoration strength adjustment section, and a restoration processing execution section).

FIG. 10 is a control block diagram illustrating an example of the restoration processing in the image adjustment section 100 (the restoration strength adjustment section 110, and the restoration processing execution section 105).

First, the restoration filter F is applied to the original image data Do (filter application processing $P_f$), and the restored image data Dr1 is calculated. The restoration filter F applied to the original image data Do is not particularly limited as long as the filter is based on the point spread function (PSF, OTF, MTF, PTF, or the like) of the optical system (the lens 16, the aperture stop 17, or the like), and may be a real-space filter or a frequency-space filter (refer to FIG. 4).

Thereafter, a difference between the image data pieces before and after the restoration processing is derived (difference derivation processing $P_d$), and the amplification ratio (restoration gain) of the difference is adjusted (gain adjustment processing $P_g$). That is, in the difference derivation processing $P_d$, differential data $\Delta D$ ($\Delta D = Dr1 - Do$) between the original image data Do and the restored image data Dr1 subjected to the filter application processing $P_f$ is calculated. Then, in the gain adjustment processing $P_g$, adjustment of the amplification ratio (restoration gain) G of the differential data $\Delta D$ is performed, a difference value ($G \times \Delta D$) after the amplification ratio adjustment is calculated, and addition processing Pa between the original image data Do and the difference value ($G \times \Delta D$) after the amplification ratio adjustment is performed, thereby calculating restored image data Dr2 (Dr2=Do+$G \times \Delta D$). It should be noted that, as the restoration processing, another method similar to the above-mentioned method may be adopted. For example, the following processing may be adopted. The restoration filter F is applied to the original image data Do (filter application processing $P_f$), and the restored image data Dr1 is calculated. Subsequently, in the gain adjustment processing $P_g$, adjustment of the amplification ratio (restoration gain) G is applied to the restored image data Dr1 (Dr1×G), and addition processing Pa, in which the above data and the original image data Do are multiplied by (1−G), is performed. Thereby, restored image data Dr2 may be calculated.

As described above, the restoration strength of the restoration processing changes on the basis of the restoration filter (filter coefficient) in the filter application processing $P_f$ and the amplification ratio (restoration gain) G in the gain adjustment processing $P_g$. Hence, the adjustment of the restoration strength of the restoration processing can be executed through "switching the restoration filter (filter coefficient) used in the filter application processing $P_f$" and/or "changing of the amplification ratio (restoration gain) G in the gain adjustment processing $P_g$".

Accordingly, the restoration strength adjustment section 110 (refer to FIG. 5) is able to adjust the restoration strength of the restoration processing by adjusting the filter coefficient of the restoration filter F or adjusting the restoration gain G.

Next, a description will given of a restoration processing flow which is performed by the image processing section 35 (restoration processing section 36) having the above-mentioned functional blocks.

Figure 11:
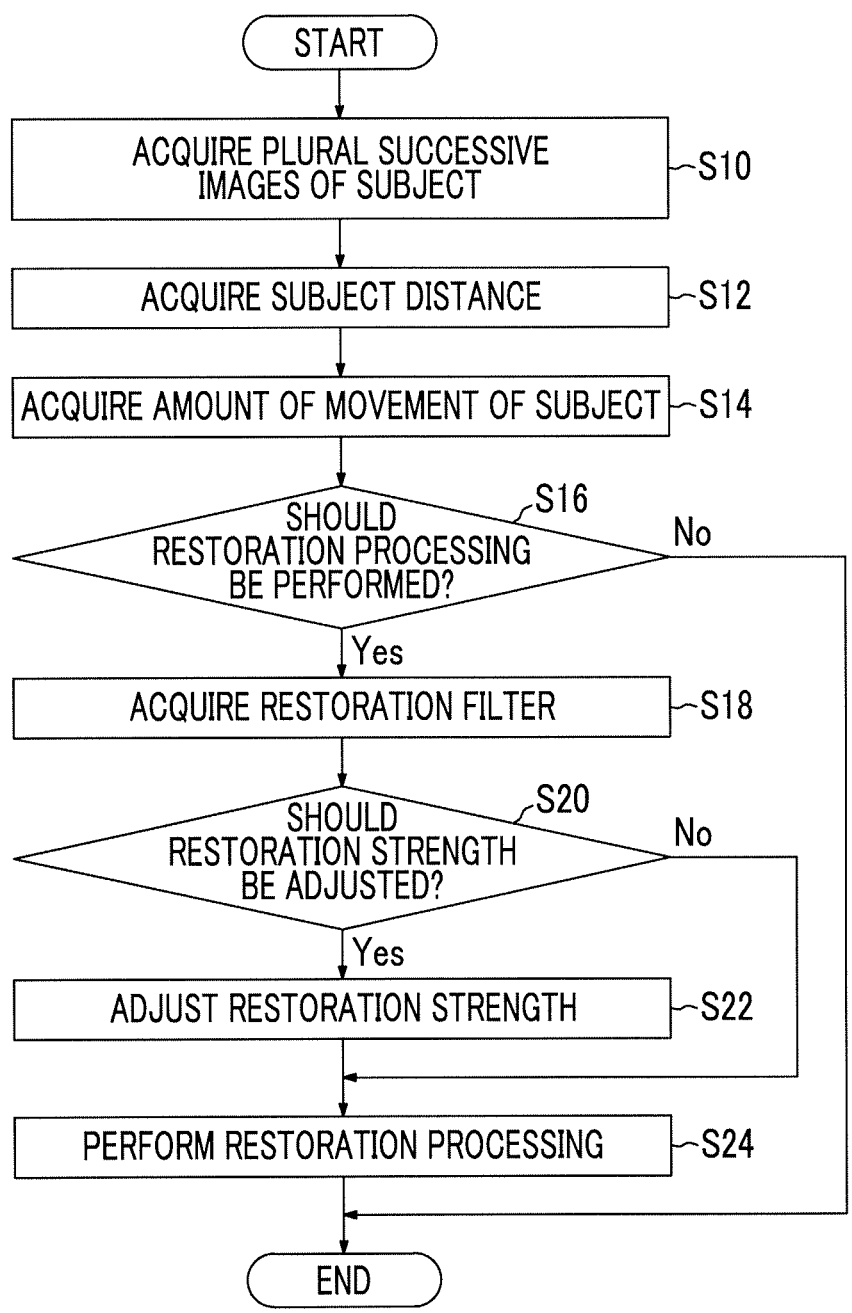
FIG. 11 is a flowchart illustrating a restoration processing flow according to the first embodiment.

FIG. 11 is a flowchart illustrating the restoration processing flow according to the first embodiment.

First, the imaging section 11 of the digital camera 10 captures images of a subject through the optical system 12, thereby generating a plurality of successive images of the subject (step S10 of FIG. 11: a generation step). The subject distance acquisition section 115 acquires subject distances thereof (step S12: a subject distance acquisition step). Then, the movement amount acquisition section 120 acquires an amount of movement of the subject Q (step S14: a movement amount acquisition step). Thereafter, the restoration processing determination section 125 determines whether or not the restoration processing should be performed on a processing target frame (processing target image) (step S16: a restoration processing determination step).

If it is determined that the restoration processing should not be performed (No in step S16), the restoration processing is skipped and another image processing is performed as necessary. In contrast, if it is determined that the restoration processing should be performed (Yes in step S16), the filter acquisition section 130 acquires the restoration filter, and sends the acquired restoration filter to the image adjustment section 100 (step S18: a filter acquisition step). Then, the restoration processing determination section 125 determines whether or not the restoration strength should be adjusted (step S20: a restoration processing determination step).

If it is determined that the restoration strength should not be adjusted (No in step S20), the restoration processing execution section 105 performs the restoration processing on the processing target frame through the restoration filter which is acquired in the restoration filter acquisition step (S18) (step S24: a restoration processing execution step). In contrast, if it is determined that the restoration strength should be adjusted (Yes in step S20), the restoration strength adjustment section 110 adjusts the restoration strength of the restoration processing (step S22: a restoration strength adjustment step). Subsequently, the restoration processing execution section 105 performs the restoration processing in a state where the restoration strength of the restoration processing is adjusted (step S24: a restoration processing execution step).

The other processing accompanying the determination, which includes the determination (S16) as to whether or not the restoration processing should be performed and the determination (S20) as to whether or not the restoration strength should be adjusted, is performed for each of the images (frames) constituting the successive images, thereby optimizing the restoration processing on an image basis.

As described above, according to the above-mentioned first embodiment, image quality is improved through the restoration processing by adjusting the method of performing the restoration processing on the basis of the amount of movement of the subject Q. On the other hand, it is possible to effectively prevent image quality from being degraded by overcorrection and the like caused by the restoration processing performed on the defocused image.

Second Embodiment

The present embodiment will describe an example where image quality is prevented from being degraded by overcorrection and the like, which are caused by the restoration processing performed on the defocused image, by controlling autofocusing (tracking autofocusing) on the basis of "the amount of movement of the subject" in the optical axis direction of the optical system 12.

In the present embodiment, configurations and effects the same as those of the above-mentioned first embodiment will be omitted.

Figure 12:
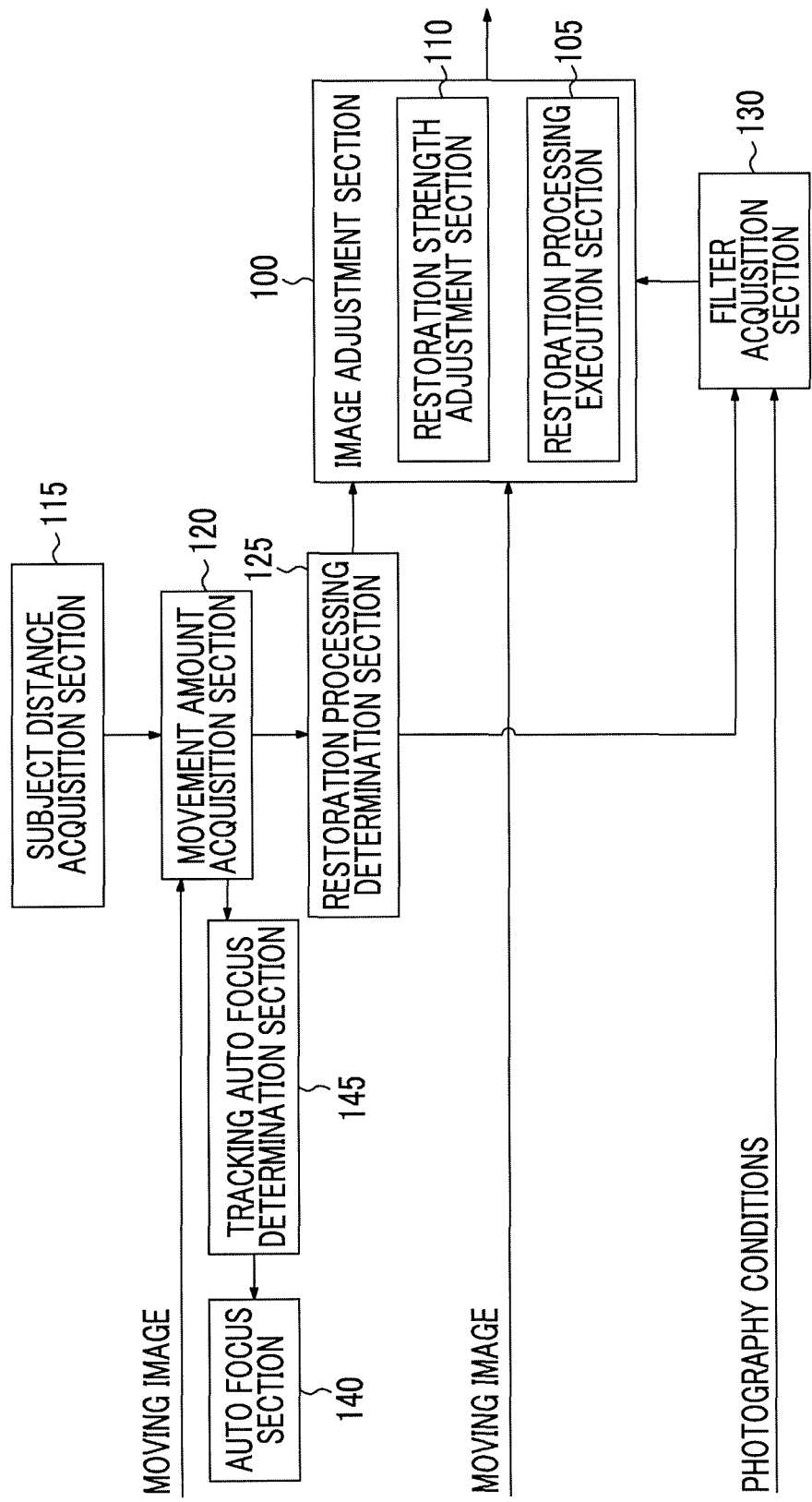
FIG. 12 is a functional block diagram illustrating restoration processing of a second embodiment.

FIG. 12 is a functional block diagram illustrating the restoration processing of a second embodiment, and shows various functional blocks constituting the image processing section 35 (refer to FIG. 2). The image processing section 35 of the present embodiment has not only the functional blocks (refer to FIG. 5) according to the above-mentioned first embodiment but also an auto focus section 140 and a tracking auto focus determination section 145.

The auto focus section 140 controls the optical system 12 through the optical system controller 20 (refer to FIG. 1) so as to track the subject Q and perform autofocusing on the subject Q. That is, the auto focus section 140 controls the optical system 12 such that the subject Q is constantly set to be in focus by changing a focus area for capturing the subject Q on the basis of the motion of the subject Q.

Figure 13A:
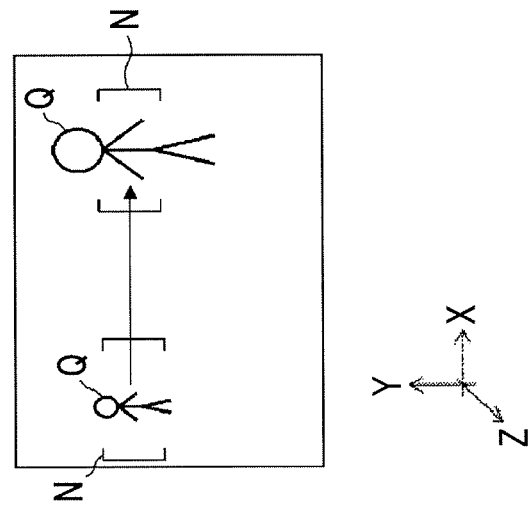
FIGS. 13A and 13B are diagrams illustrating tracking autofocusing, and show live view images displayed on a display section of a digital camera.
Figure 13B:
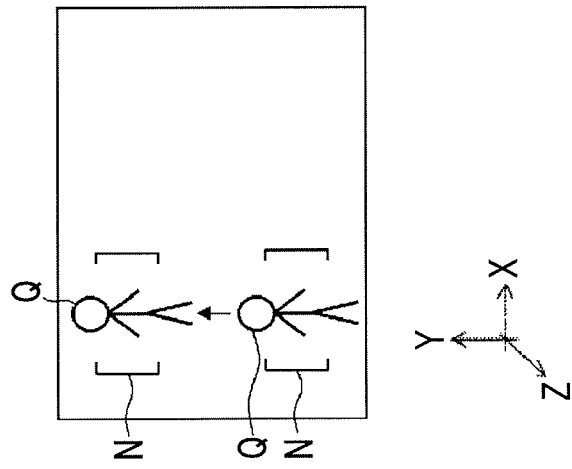

FIGS. 13A and 13B are diagrams illustrating tracking autofocusing, and show live view images displayed on the display section 33 (refer to FIG. 1) of the digital camera 10.

In the present example, a focus area N tracks the subject Q in accordance with movement of the subject Q while the tracking autofocusing is active, and autofocusing is performed such that the subject Q is constantly in focus while the subject Q is tracked. In contrast, when the tracking autofocusing is stopped, the focus area N is disposed at a predetermined position, and autofocusing at the position is performed. Here, the predetermined position may be the center of the image, and may be a position at which the tracking autofocusing is stopped.

The live view image shown in FIG. 13A indicates a case where the subject Q moves toward the upper side of the display section 33 (in the Y direction in FIGS. 13A and 13B). The live view image shown in FIG. 13B indicates a case where the subject Q moves in the X and Z directions. As shown in FIGS. 13A and 13B as such live view images, the focus area N tracks the subject Q in accordance with the movement of the subject Q.

However, when the motion of the subject Q is excessively fast, an auto focus ability of the digital camera 10 is not sufficient for the motion of the subject Q, the subject Q may not be continuously brought into focus, and a photographed image may be defocused.

The tracking auto focus determination section 145 of FIG. 12 determines whether the auto focus control of the optical system 12 for tracking the subject Q should be stopped or continued, on the basis of the amount of movement of the subject Q acquired by the movement amount acquisition section 120. Specifically, the tracking auto focus determination section 145 has a threshold value for the amount of movement of the subject Q, and compares the threshold value with the amount of movement of the subject Q, thereby determining whether or not the subject Q should be tracked and subjected to the autofocusing.

For example, if the amount of movement of the subject Q is greater than the threshold value, the tracking auto focus determination section 145 determines that the tracking autofocusing should be stopped. In this case, the auto focus section 140 newly performs the auto focus control of the optical system 12 on the subject Q within the focus area in the images which are generated by the imaging section 11. In contrast, if the amount of movement of the subject Q is equal to or less than the threshold value, the tracking auto focus determination section 145 determines that the tracking autofocusing should be continued. Then, the auto focus section 140 continues the tracking of the subject, and performs the auto focus control (tracking auto focus control) of the optical system 12.

FIG. 12 described the imaging device 10 having the restoration processing determination section 125 and the restoration strength adjustment section 110, but the present invention is limited to this. For example, an aspect of the imaging device 10, which does not have the restoration processing determination section 125 and the restoration strength adjustment section 110, may be considered. In this aspect, when the restoration processing execution section 105 performs the restoration processing on the plurality of successive images, the tracking auto focus determination section 145 determines whether the auto focus control of the optical system for tracking the subject should be stopped or continued, on the basis of the amount of movement acquired from the movement amount acquisition section 120. In such a manner, if the amount of movement acquired from the movement amount acquisition section 120 is large, the restoration processing is preferentially performed on the plurality of successive images by the restoration processing execution section 105, and the tracking autofocusing is controlled such that it stops. If the auto focus ability of the digital camera 10 is not sufficient for the motion of the subject Q, for example, if the motion of the subject Q is excessively fast, the subject Q may not be continuously brought into focus, and a photographed image may be defocused. In this case, using the above-mentioned method, it is possible to prevent image quality from being degraded by the restoration processing. Further, in response to receiving designation of the control mode from a user, control to give priority to such restoration processing and stop the tracking autofocusing, and control to give priority to autofocusing and adjust the restoration strength of the restoration processing may be switched between.

Figure 14:
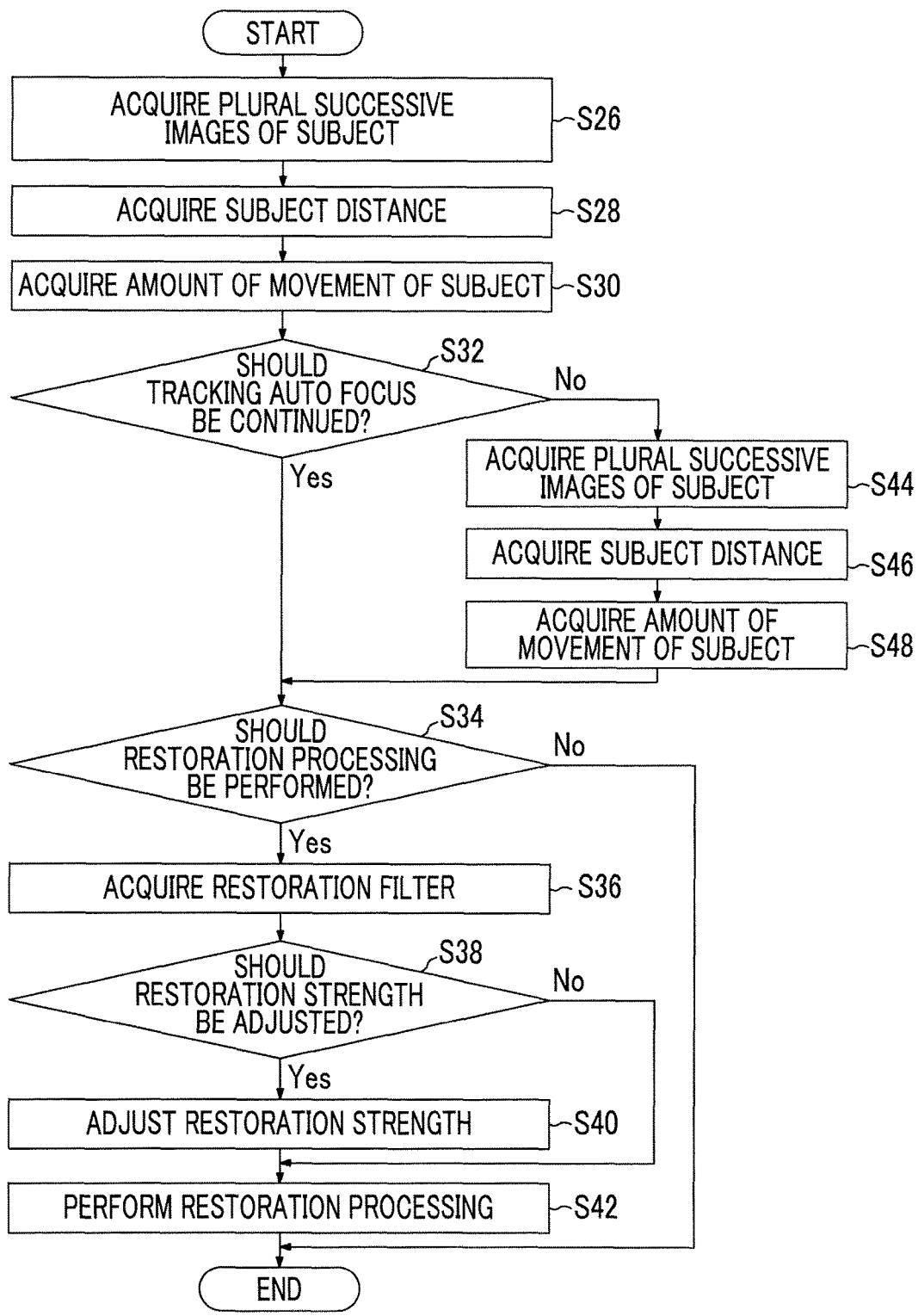
FIG. 14 is a flowchart illustrating a restoration processing flow according to the second embodiment.

FIG. 14 is a flowchart illustrating a restoration processing flow according to the second embodiment.

First, the imaging section 11 acquires the plurality of successive images of the subject Q as a tracking target (step S26 of FIG. 14), and the subject distance acquisition section 115 acquires the subject distances of the tracking target subject Q (step S28). Then, the movement amount acquisition section 120 acquires the amount of movement of the subject (step S30), and the tracking auto focus determination section 145 determines whether or not the tracking autofocusing should be continued, on the basis of the acquired amount of movement of the subject Q (step S32).

If the amount of movement of the subject Q which is being tracked is greater than the threshold value, the tracking auto focus determination section 145 determines that the tracking autofocusing should not be continued (No in step S32). Then, the auto focus section 140 cancels the tracking autofocusing, sets a subject within a focus area as a new auto focus target, and acquires successive images (step S44). Subsequently, the subject distance acquisition section 115 acquires the subject distances (step S46). Thereafter, the movement amount acquisition section 120 acquires the amount of movement of the subject Q (step S48). Then, the restoration processing determination section 125 determines whether or not the restoration processing should be performed (step S34).

In contrast, if the amount of movement of the subject Q as a tracking target is equal to or less than the threshold value, the tracking auto focus determination section 145 determines that the tracking autofocusing should be continued (Yes in step S32). Then, the restoration processing determination section 125 determines whether or not the restoration processing should be performed (step S34).

If the restoration processing determination section 125 determines that the restoration processing should not be performed (No in step S34), the restoration processing is skipped and another image processing is performed as necessary. In contrast, if the restoration processing determination section 125 determines that the restoration processing should be performed (Yes in step S34), the filter acquisition section 130 acquires the restoration filter (step S36: a filter acquisition step). Then, the restoration processing determination section 125 determines whether or not the restoration strength of the restoration processing should be adjusted (step S38: a restoration processing determination step).

If it is determined that the restoration strength of the restoration processing should not be adjusted (No in step S38), the restoration processing execution section 105 performs the restoration processing on the images (frames) through the restoration filter which is acquired in the restoration filter acquisition step (S36) (step S42: a restoration processing execution step). In contrast, if it is determined that the restoration strength of the restoration processing should be adjusted (Yes in step S20), the restoration strength adjustment section 110 adjusts the restoration strength of the restoration processing (step S40: a restoration strength adjustment step). Then, the restoration processing execution section 105 performs the restoration processing in a state where the restoration strength of the restoration processing is adjusted (step S42: the restoration processing execution step).

As described above, according to the above-mentioned second embodiment, even when the images of the subject Q are captured by performing the tracking autofocusing, it is possible to appropriately perform the restoration processing.

Third Embodiment

In the present embodiment, a description will be given of an example in which the restoration processing is controlled on the basis of "the frame rate" so as to prevent image quality from being graded by the restoration processing.

In the present embodiment, configurations and effects the same as those of the above-mentioned first embodiment will be omitted.

Figure 15:
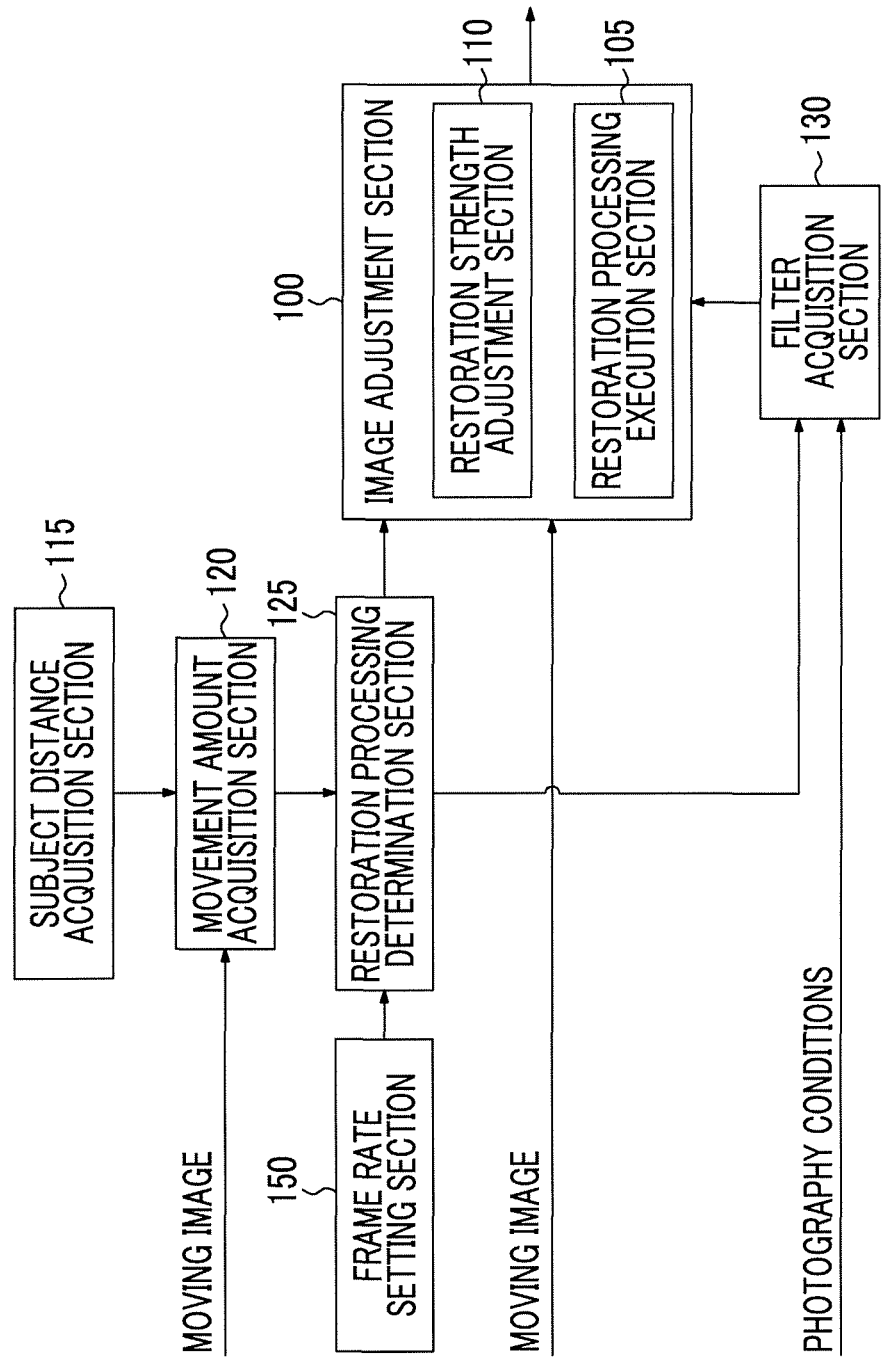
FIG. 15 is a functional block diagram illustrating restoration processing of a third embodiment.

FIG. 15 is a functional block diagram illustrating the restoration processing of a third embodiment, and shows various functional blocks constituting the image processing section 35 (refer to FIG. 2). The image processing section 35 of the present embodiment has not only the functional blocks (refer to FIG. 5) according to the above-mentioned first embodiment but also a frame rate setting section 150.

The frame rate setting section 150 sets a frame rate for generation of the successive images such as a moving image in the imaging section 11, and controls generation of the plurality of successive images performed by the imaging element 26. The frame rate is the number of frames (the number of images) per unit time period, and is generally represented by the number of frames (unit: fps (frames per second)) in one second. For example, if the frame rate is 30 fps, 30 images are generated in one second.

The frame rate, which is set by the frame rate setting section 150, may be a frame rate which is determined by a user's instruction through the user interface 37, and may be a frame rate which is determined in advance.

The restoration processing determination section 125 determines whether the restoration processing should be performed on the images, the restoration strength of the restoration processing should be adjusted and the restoration processing should be performed on the images, or the restoration processing should not be performed on the images, on the basis of the frame rate which is set by the frame rate setting section 150. That is, the restoration processing determination section 125 acquires the frame rate corresponding to the images from the frame rate setting section 150, and determines whether the restoration processing should be performed on the images generated at the frame rate or the restoration strength of the restoration processing should be adjusted and the restoration processing should be performed on the images.

The restoration processing determination section 125 has, for example, a threshold value of the frame rate, and compares the threshold value of the frame rate with the frame rate which is acquired from the frame rate setting section 150, thereby performing determination relating to the restoration processing. It should be noted that the threshold value of the frame rate can be set in various ways by using the subject Q, the subject distances, the photography conditions, and the camera function, or the like. For example, the threshold value of the frame rate may be set to 30 fps or 60 fps.

If the frame rate acquired by the frame rate setting section 150 is greater than the threshold value, the restoration processing determination section 125 determines that the restoration processing should be performed. The reason for this is that, if the frame rate acquired by the frame rate setting section 150 is greater than the threshold value, the amount of movement of the subject Q between frames is relatively small, the photographed image of the subject Q is highly likely to be focused, and image quality is less likely to be degraded even when the restoration processing is performed. Then, it can be expected that image quality is newly improved by performing the restoration processing.

In contrast, if the frame rate acquired by the frame rate setting section 150 is equal to or less than the threshold value, the restoration processing determination section 125 determines that the restoration processing should not be performed. The reason for this is that, if the frame rate acquired by the frame rate setting section 150 is equal to or less than the threshold value, the amount of movement of the subject Q between frames is relatively large, the photographed image of the subject Q is highly likely to be defocused, and image quality is likely to be degraded when the restoration processing is performed on the defocused image.

The restoration processing determination section 125 may adjust the restoration strength of the restoration processing on the basis of the frame rate. In accordance with the frame rate, the focused state of the photographed image of the subject Q is likely to be imperfect. In this case, by adjusting the restoration strength of the restoration processing, it is possible to prevent image quality from being degraded by the restoration processing performed on the defocused image.

Next, a relationship between the frame rate and the amount of movement of the subject Q will be described.

Figure 16:
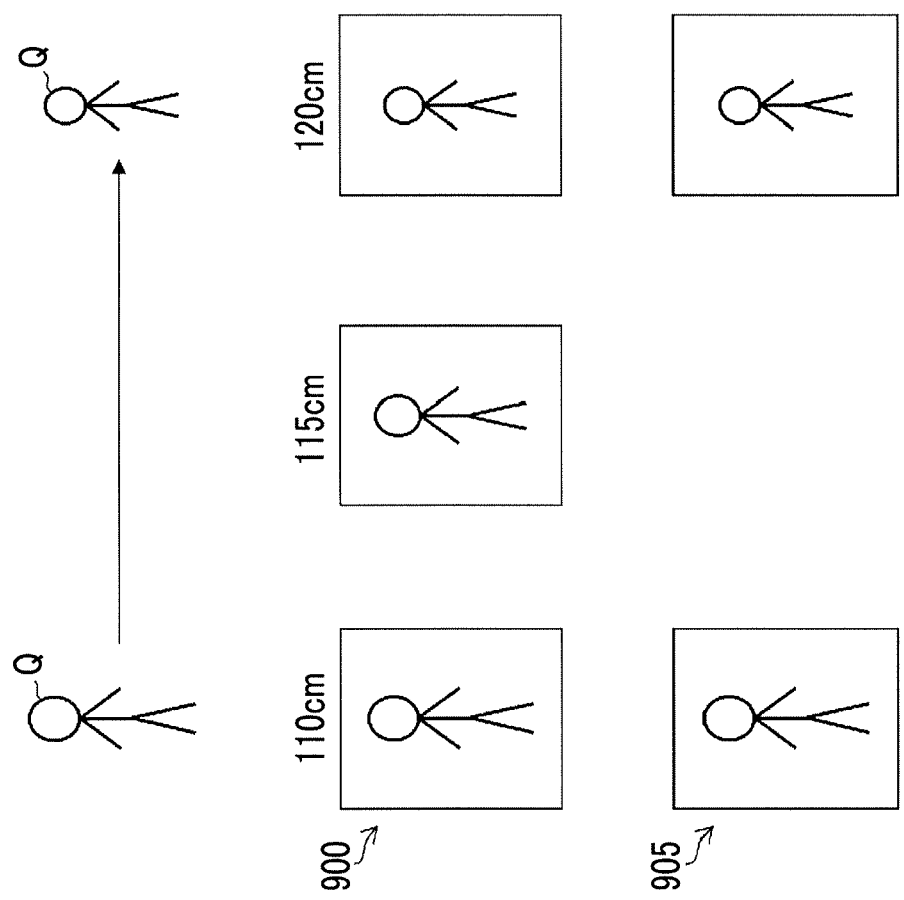
FIG. 16 is a diagram illustrating images of the moving subject Q which are generated at different frame rates.

FIG. 16 is a diagram illustrating images of the moving subject Q generated at different frame rates. The diagram shows a case where movement of the subject Q from the subject distance of 110 cm to the subject distance of 120 cm is photographed at a high frame rate (for example, 60 fps) (refer to the reference number "900" in FIG. 16), and shows a case where the movement is photographed at a low frame rate (for example 30 fps) (refer to the reference number "905" in FIG. 16).

In the example of the high frame rate image shown in FIG. 16, while the subject Q is moving from the subject distance of 110 cm to the subject distance of 120 cm, the frame at the subject distance of 110 cm, the frame at the subject distance of 115 cm, and the frame at the subject distance of 120 cm are generated. Consequently, the amount of movement of the subject Q between frames is 5 cm.

In contrast, in the example of the low frame rate image shown in FIG. 16, while the subject Q is moving from the subject distance of 110 cm to the subject distance of 120 cm, the frame at the subject distance of 110 cm and the frame at the subject distance of 120 cm are generated. Consequently, the amount of movement of the subject Q between frames is 10 cm.

As described above, also when the subjects Q moving by the same distance (from the subject distance of 110 cm to the subject distance 120 cm) are photographed, if the frame rates are different, the amounts of movement of the subjects Q between frames are different. Consequently, the restoration processing determination section 125 determines whether the restoration processing should be performed with reference to the frame rate, whereby it is possible to improve image quality through the restoration processing, and it is possible to prevent image quality from being degraded by the restoration processing.

Figure 17:
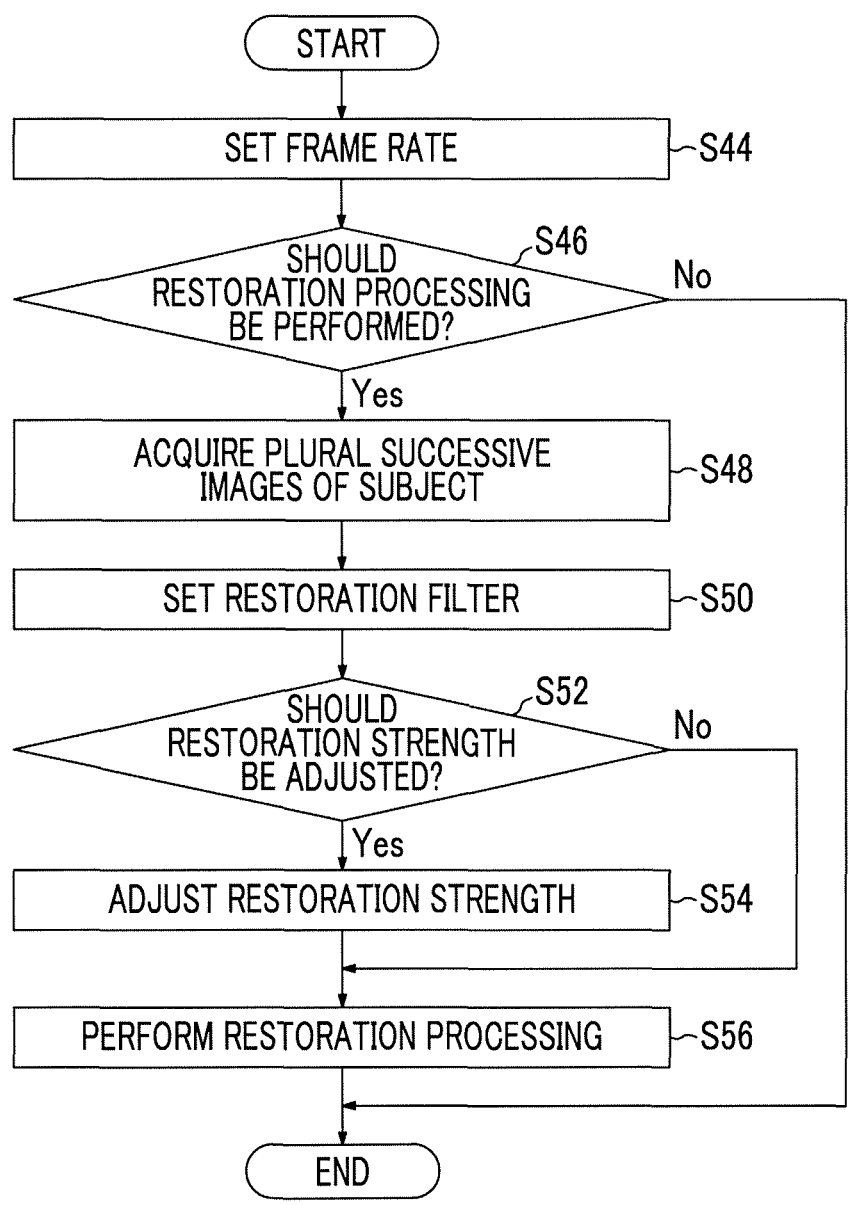
FIG. 17 is a flowchart illustrating a restoration processing flow according to the third embodiment.

FIG. 17 is a flowchart illustrating the restoration processing flow according to the third embodiment.

First, the frame rate setting section 150 sets the frame rate of the successive images generated by the imaging element 26 of the imaging section 11 (step S44 in FIG. 17: a frame rate setting step). Then, the restoration processing determination section 125 determines whether or not the restoration processing should be performed, on the basis of the frame rate which is set by the frame rate setting section 150 (step S46: a restoration processing determination step).

If the restoration processing determination section 125 determines that the restoration processing should not be performed (No in step S46), the restoration processing is not performed, and another image processing is performed as necessary. In contrast, if the restoration processing determination section 125 determines that the restoration processing should be performed (Yes in step S46), the imaging section 11 acquires the plurality of successive images at the set frame rate (step S48: a generation step). Thereafter, the filter acquisition section 130 acquires the restoration filter (step S50: a filter acquisition step). The restoration processing determination section 125 determines whether or not the restoration strength should be adjusted (step S52: a restoration strength adjustment step).

If it is determined that the restoration strength should not be adjusted (No in step S52), the restoration processing execution section 105 performs the restoration processing on the processing target frame through the restoration filter which is acquired in the restoration filter acquisition step (step S50) (step S56: a restoration processing execution step). In contrast, if it is determined that the restoration strength should be adjusted (Yes in step S52), the restoration strength adjustment section 110 adjusts the restoration strength of the restoration processing (step S54: a restoration strength adjustment step). Then, the restoration processing execution section 105 performs the restoration processing in a state where the restoration strength of the restoration processing is adjusted (step S56: the restoration processing execution step).

Figure 18:
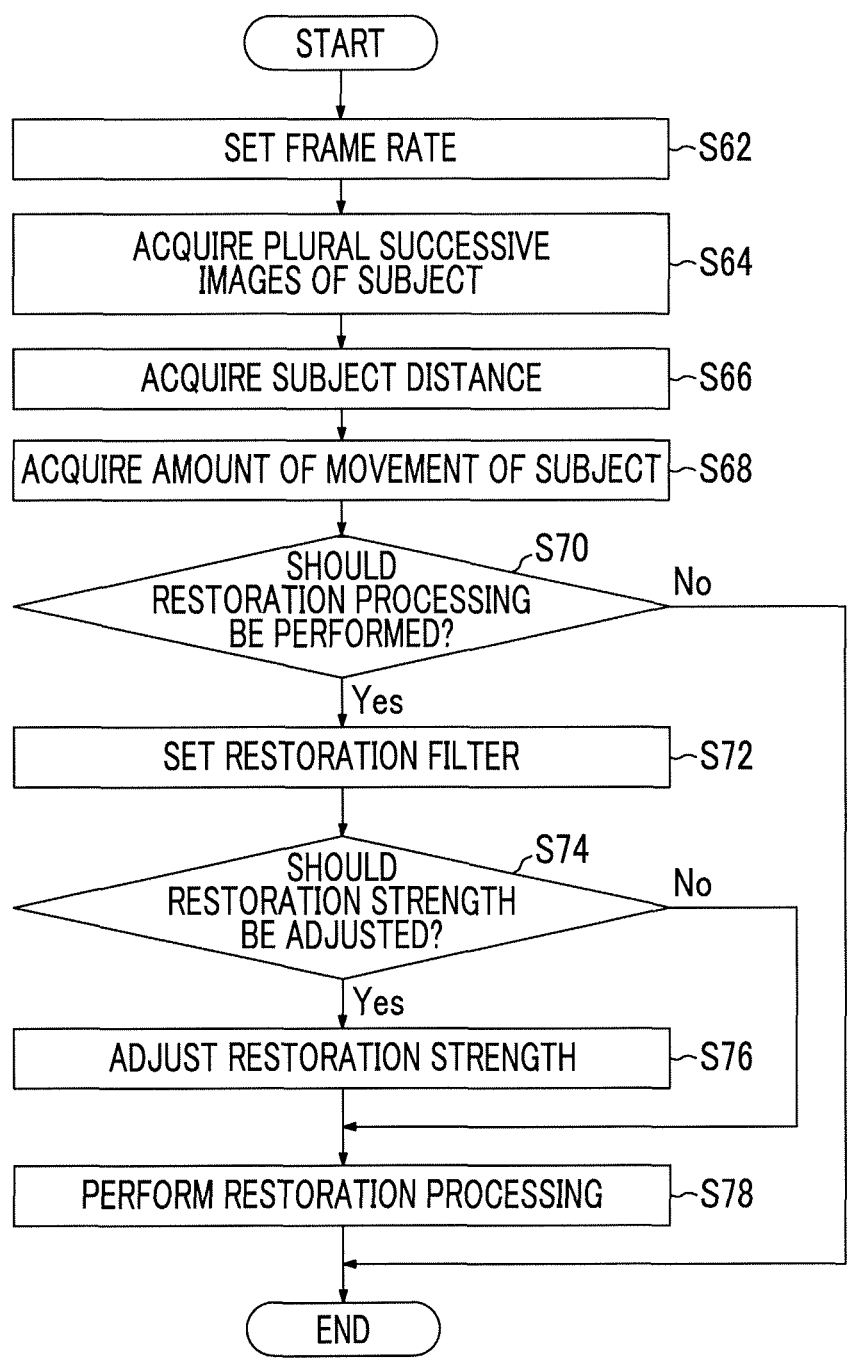
FIG. 18 is a flowchart illustrating a modification example of a restoration processing flow according to the third embodiment.

FIG. 18 is a flowchart illustrating a modification example of a restoration processing flow according to the third embodiment.

In the present modification example, the restoration processing determination section 125 determines whether the restoration processing should be performed on the basis of the frame rate and the amount of movement of the subject Q. That is, first, the frame rate setting section 150 sets the frame rate (step S62), and acquires successive images at the set frame rate (step S64). Then, the subject distance acquisition section 115 acquires the subject distances (step S66). The movement amount acquisition section 120 acquires the amount of movement of the subject Q (step S68). Subsequently, the restoration processing determination section 125 determines whether the restoration processing should be performed on the basis of the frame rate, which is set by the frame rate setting section 150, and the amount of movement of the subject Q which is acquired by the movement amount acquisition section 120 (step S70). If the restoration processing determination section 125 determines that the restoration processing should not be performed (No in step S70), the restoration processing is skipped, and another image processing is performed as necessary.

In contrast, if the restoration processing determination section 125 determines that the restoration processing should be performed (Yes in step S70), the filter acquisition section 130 acquires the restoration filter (step S72). Then, the restoration processing determination section 125 determines whether or not the restoration strength of the restoration processing should be adjusted (step S74).

If it is determined that the restoration strength should not be adjusted (No in step S74), the restoration processing execution section 105 performs the restoration processing on the processing target frame through the restoration filter which is acquired in the restoration filter acquisition step (step S72) (step S78: a restoration processing execution step). In contrast, if it is determined that the restoration strength should be adjusted (Yes in step S74), the restoration strength adjustment section 110 adjusts the restoration strength of the restoration processing (step S76: a restoration strength adjustment step). Then, the restoration processing execution section 105 performs the restoration processing in a state where the restoration strength of the restoration processing is adjusted (step S78: the restoration processing execution step).

As described above, according to the above-mentioned third embodiment, the method of performing the restoration processing depending on the frame rate is adjusted. Thus, even if the movement of the subject Q is large, it is possible to appropriately perform the restoration processing.

Fourth Embodiment

In the present embodiment, the restoration processing determination section 125 determines whether the restoration processing should be performed in consideration of whether the subject Q is in focus (in the focused state) or out of focus (in the defocused state). In other words, if the subject Q is in the focused state, the restoration processing determination section 125 determines that the general restoration processing should be performed on images thereof through the restoration filter (the restoration processing is performed without adjusting the restoration strength of the restoration processing). In contrast, if the subject Q is in the defocused state, it is determined that the restoration strength of the restoration processing should be adjusted and the restoration processing should be performed on the images.

In the present embodiment, configurations and effects the same as those of the above-mentioned first embodiment will be omitted.

Figure 19:
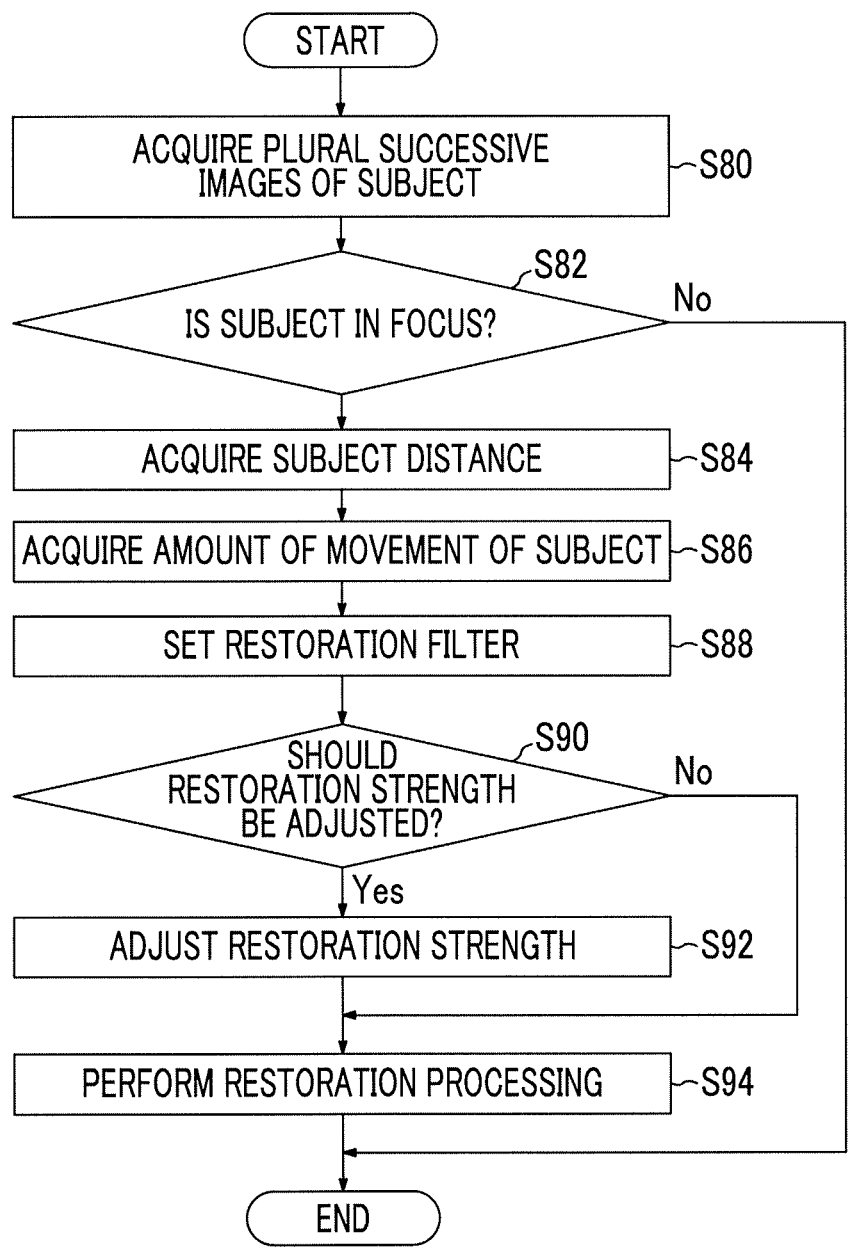
FIG. 19 is a flowchart illustrating a restoration processing flow according to the fourth embodiment.

FIG. 19 is a flowchart illustrating a restoration processing flow according to the fourth embodiment.

First, the imaging section 11 acquires the plurality of successive images (step S80). The restoration processing determination section 125 determines whether the subject Q is in the focused state or the defocused state. In addition, the restoration processing determination section 125 is able to acquire information as to whether the subject Q is in the focused state or the defocused state, in various ways. For example, the restoration processing determination section 125 may acquire the information as to whether the subject Q is in the focused state or the defocused state, from the optical system controller 20 or the imaging element 26. Further, when the digital camera 10 (imaging device) has a separate component capable of detecting this focused state, the component may acquire the information as to whether the subject Q is in the focused state or the defocused state.

Then, if the restoration processing determination section 125 acquires the information that the subject Q is in the defocused state (No in step S82), the restoration processing is not performed, and another image processing is performed as necessary. The reason for this is that if the restoration processing is performed on the defocused images of the subject Q, image quality may be instead degraded.

In contrast, if the restoration processing determination section 125 determines that the restoration processing should be performed (Yes in step S82), the subject distance acquisition section 115 acquires the subject distances (step S84), and the movement amount acquisition section 120 acquires the amount of movement of the subject Q (step S86). Then, the filter acquisition section 130 acquires the restoration filter (step S88), and the restoration processing determination section 125 determines whether or not the restoration strength of the restoration processing should be adjusted (step S90).

If it is determined that the restoration strength should not be adjusted (No in step S90), the restoration processing execution section 105 performs the restoration processing on the target frame through the restoration filter which is acquired in the restoration filter acquisition step (step S88) (step S94). In contrast, if it is determined that the restoration strength should be adjusted (Yes in step S90), the restoration strength adjustment section 110 adjusts the restoration strength of the restoration processing (step S92), and the restoration processing execution section 105 performs the restoration processing in a state where the restoration strength of the restoration processing is adjusted (step S94).

As described above, according to the above-mentioned fourth embodiment, since the method of performing the restoration processing is adjusted on the basis of whether the subject Q is in the defocused state or the focused state, it is possible to perform the restoration processing appropriate for the subject Q.

Fifth Embodiment

In the present embodiment, when the restoration processing is not performed, a description will be given of an example of performing blurred image correction processing different from the restoration processing.

In the present embodiment, configurations and effects the same as those of the above-mentioned first embodiment will be omitted.

Figure 20:
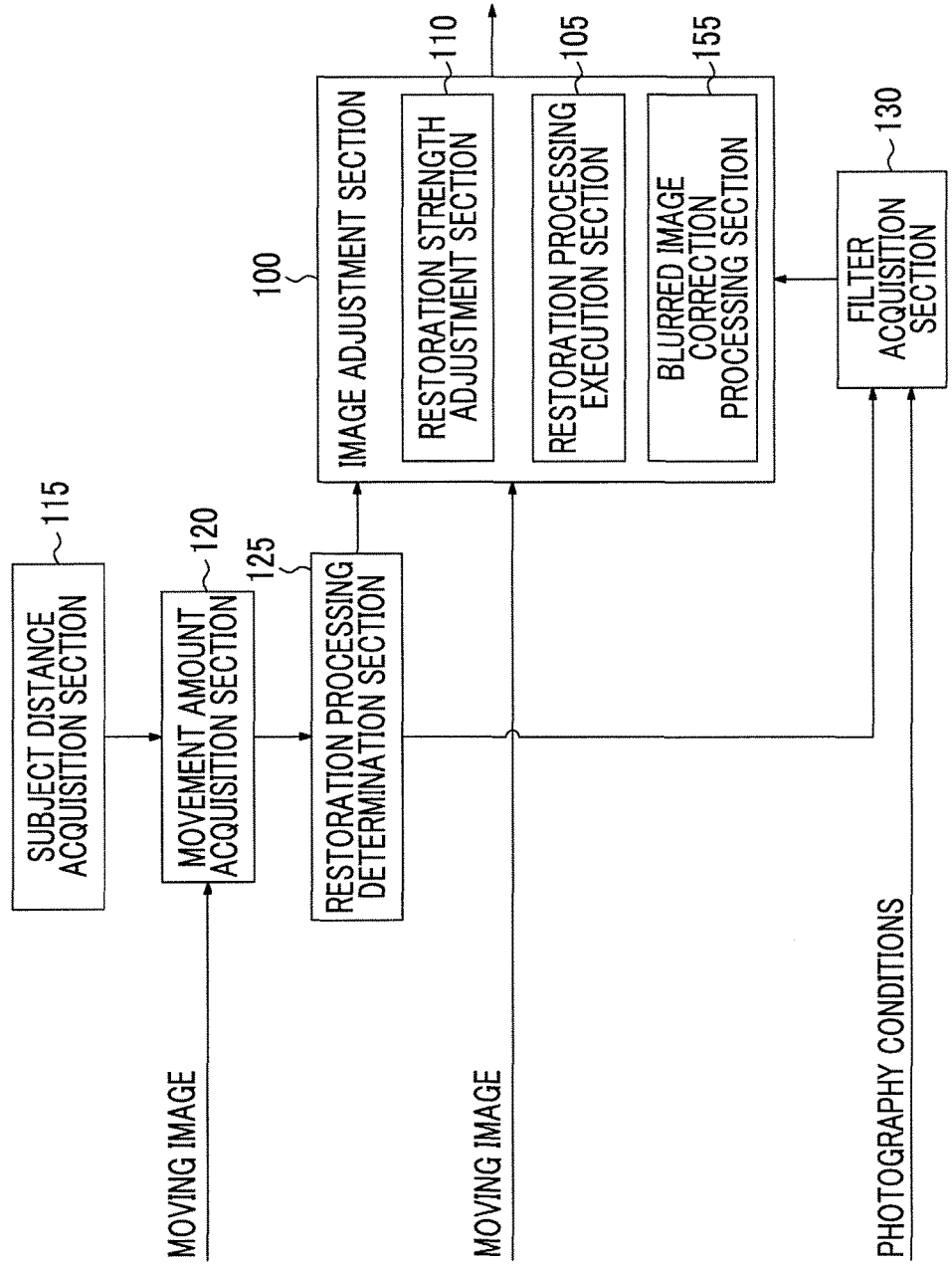
FIG. 20 is a functional block diagram illustrating restoration processing of a fifth embodiment.

FIG. 20 is a functional block diagram illustrating the restoration processing of a fifth embodiment, and shows various functional blocks constituting the image processing section 35 (refer to FIG. 2). In the image processing section 35 of the present embodiment, in addition to the functional blocks according to the above-mentioned first embodiment (refer to FIG. 5), the image adjustment section 100 has a blurred image correction processing section 155.

If the restoration processing determination section 125 determines that "the restoration processing should not be performed and blurred image correction processing different from the restoration processing should be performed", the blurred image correction processing section 155 performs the blurred image correction processing different from the restoration processing on the processing target image. The "blurred image correction processing" described herein is the blurred image correction processing which does not use a transfer function for point distribution of the optical system 12, is not particularly limited, and may be, for example, outline correction processing. If the image adjustment section 100 (blurred image correction processing section 155) performs the outline correction processing, the filter acquisition section 130 acquires a filter (filter for outline correction) having frequency characteristics for outline correction, and outline correction is performed on the processing target image. The "filter having frequency characteristics for outline correction" described herein is not particularly limited as long as it is a filter for making image quality better in the outline portion (edge portion) within the image (original image data). For example, as the filter, a filter for highlighting the outline portion may be employed.

As described above, according to the above-mentioned fifth embodiment, even when the restoration processing is not performed, it is possible to appropriately correct blurred images.

It should be noted that, in the above-mentioned embodiments, the plurality of successive images (successive images) subjected to the restoration processing can be displayed in various ways. For example, the successive images subjected to the restoration processing may be displayed as a live view images on the display section 33 provided in the digital camera 10 (imaging device, refer to FIG. 1), and may be displayed on the display 66 of the computer 60 connected to the digital camera 10.

<Another Modification Example>

The above-mentioned digital camera 10 is just an example, and the present invention can be applied to other configurations as well. Each functional configuration can be appropriately implemented by arbitrary hardware, software, or a combination of both of them. For example, the present invention can also be applied to programs, which cause a computer to execute image processing methods and imaging methods (processing steps, and processing procedures) for the above-mentioned devices and processing sections (the camera main body controller 28, the image processing section 35, the restoration processing section 36, and the like), a computer-readable recording medium (non-transitory recording medium) onto which such programs are recorded, or various computers in which such programs are installed.

In the descriptions of the above-mentioned embodiments, the restoration processing section 36 is provided on the camera main body 14 (camera main body controller 28) of the digital camera 10. However, the restoration processing section 36 may be provided on another device such as a computer 60 or a server 80.

For example, when image data is processed in the computer 60, the restoration processing section installed in the computer 60 may perform processing of restoring the image data. Further, when the server 80 has the restoration processing section, for example, the image data is transmitted from the digital camera 10 or the computer 60 to the server 80, the restoration processing section of the server 80 performs the restoration processing on the image data, and the image data (restored image data) obtained after the restoration processing may be transmitted and provided to a transmission source. As described above, an image processing device, which has the restoration processing section provided in the computer 60, the server 80, or the like, may perform the restoration processing, and the computer 60, the server 80, or the like having the restoration processing section may perform all or a part of the restoration processing. Further, assuming that the restoration processing is performed by an electronic device other than the digital camera 10, the photography conditions acquired for each frame in a photography operation performed through the camera main body are recorded in the image data, the image data acquired from the camera is transmitted to the image processing device, and the image data is acquired by the image data acquisition section in the image processing device, whereby the restoration processing of the present invention is performed. In such a manner, the image processing device may easily perform the restoration processing. Furthermore, the subject distance information acquired for each frame in the photography operation performed through the camera main body are transmitted together with the image data to the image processing device. Thereby, likewise, the image processing device easily performs the restoration processing of the present invention. In addition, it is preferable that the acquired or recorded subject distance information is acquired for each frame, but the present invention is not limited to this. In accordance with a tolerance in degradation in image quality caused by the restoration processing, the subject distance information may be acquired once for several frames, or the subject distance information may be acquired when a photography condition changes such that the condition becomes equal to or greater than a predetermined threshold value. In such a manner, thinned out subject distance information may be acquired.

Further, embodiments, to which the present invention can be applied, are not limited to the digital camera 10, the computer 60 and the server 80. The present invention also can be applied to not only cameras that mainly have an imaging function but also mobile equipment that has not only an imaging function but also functions (a phone call function, a communication function, and other computer functions) other than an imaging function. Examples of the embodiments, to which the present invention can be applied, include a mobile phone having a camera function, a smartphone, a personal digital assistant (PDA), and a portable game machine. Hereinafter, an example of a smartphone, to which the present invention is applicable, will be described.

<Configuration of Smartphone>

Figure 21:
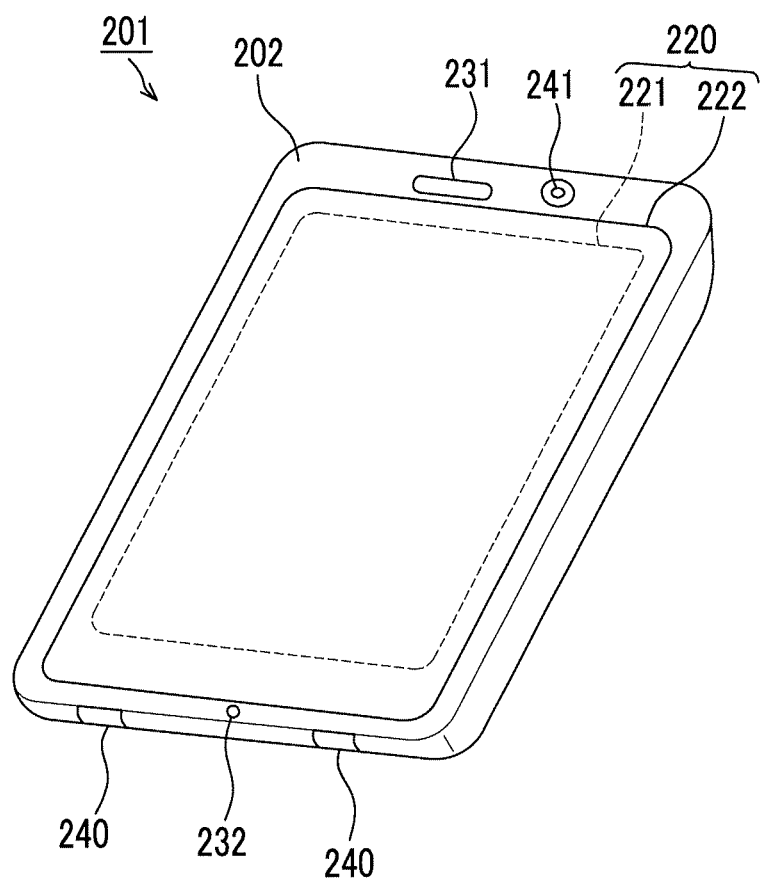
FIG. 21 shows an appearance of a smartphone as a photographing apparatus according to an embodiment of the present invention.

FIG. 21 shows an appearance of a smartphone 201 as a photographing apparatus according to the embodiment of the present invention. The smartphone 201 shown in FIG. 21 includes: a housing 202 that has a flat plate shape; a display panel 221 as a display section on one side of the housing 202; and a display input section 220 into which an operation panel 222 as an input section is integrated. Further, the housing 202 includes a speaker 231, a microphone 232, operation sections 240, and a camera section 241. In addition, the configuration of the housing 202 is not limited to this. For example, it may be possible to adopt a configuration in which the input section and the display section each are independent, or it may be possible to adopt a configuration having a slide mechanism or a folded structure.

Figure 22:
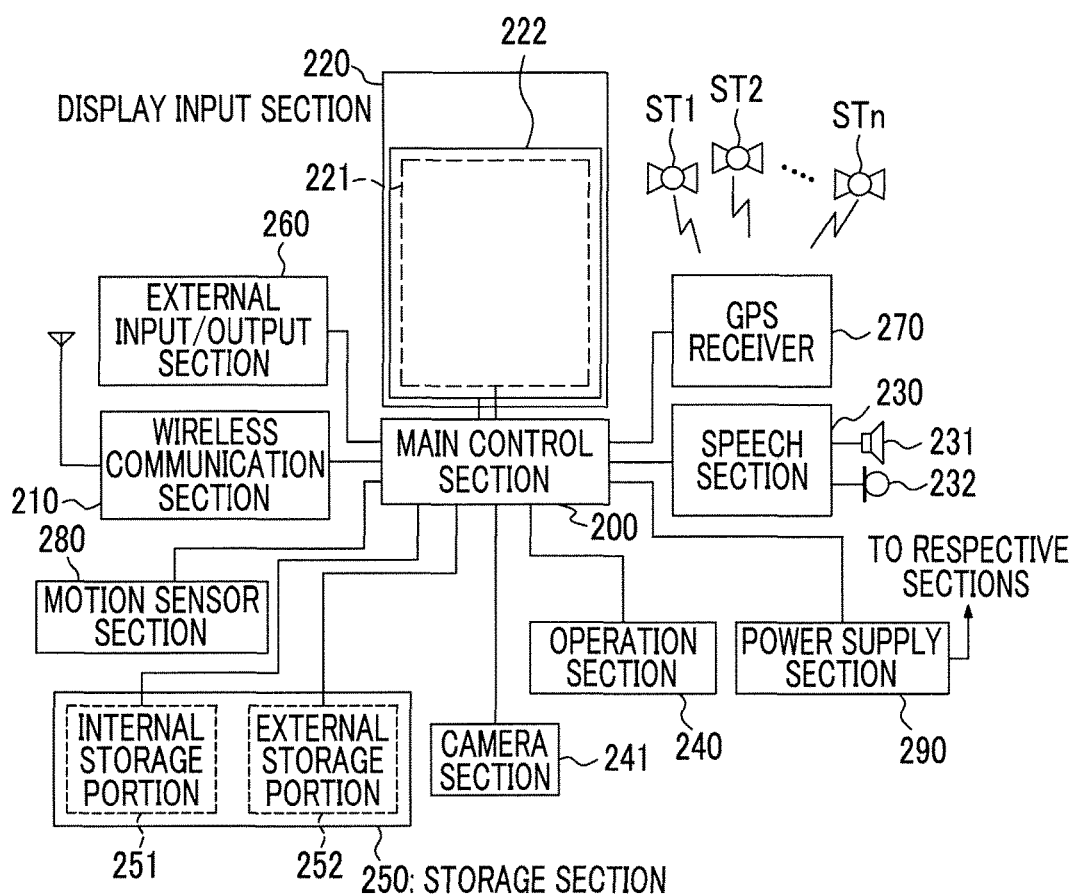
FIG. 22 is a block diagram illustrating a configuration of the smartphone shown in FIG. 21.

FIG. 22 is a block diagram illustrating a configuration of the smartphone 201 shown in FIG. 21. As shown in FIG. 22, the smartphone 201 includes, as main components, a wireless communication section 210, a display input section 220, a speech section 230, the operation sections 240, the camera section 241, a storage section 250, an external input/output section 260, a global positioning system (GPS) receiver 270, a motion sensor section 280, a power supply section 290, and a main control section 200. As the main function of the smartphone 201, there is provided a wireless communication function for performing mobile wireless communication with a base station device BS through a mobile communication network NW.

The wireless communication section 210 performs wireless communication with the base station device BS, which is included in the mobile communication network NW, in accordance with an instruction of the main control section 200. Using this wireless communication, various kinds of file data such as audio data and image data, e-mail data, and the like are transmitted and received, and web data, streaming data, and the like are received.

The display input section 220 is a so-called touch panel, and includes the display panel 221 and the operation panel 222. The touch panel displays image (still image and moving image) information, text information, or the like so as to visually transfer the information to a user in accordance with control of the main control section 200, and detects a user operation on the displayed information.

The display panel 221 uses a liquid crystal display (LCD), an organic electro-luminescence display (OELD), or the like as a display device. The operation panel 222 is a device that is provided for viewing an image which is displayed on a display screen of the display panel 221 and that detects a single pair of coordinates or a plurality of pairs of coordinates at which an operation is performed by a user's finger or a stylus. When such a device is operated by a user's finger or a stylus, the device outputs a detection signal, which is generated due to the operation, to the main control section 200. Subsequently, the main control section 200 detects the coordinates as an operation position on the display panel 221, on the basis of the received detection signal.

As shown in FIG. 21, the display panel 221 and the operation panel 222 of the smartphone 201 exemplified as an embodiment of the photographing apparatus of the present invention are integrated to constitute the display input section 220. However, the operation panel 222 is disposed to completely cover the display panel 221. When this arrangement is adopted, the operation panel 222 may have a function of also detecting a user operation in a region outside the display panel 221. In other words, the operation panel 222 may include a detection region (hereinafter referred to as a display region) for a part which overlaps with the display panel 221 and a detection region (hereinafter referred to as a non-display region) for the other part at the outer edge which does not overlap with the display panel 221.

A size of the display region and a size of the display panel 221 may completely coincide with each other, but it is not always necessary for both to coincide with each other. Further, the operation panel 222 may include two sensing regions of the outer edge part and the other inside part. Furthermore, a width of the outer edge part is appropriately designed depending on a size of the housing 202 and the like. In addition, examples of the position detection method adopted by the operation panel 222 may include a matrix switch method, a resistance film method, a surface elastic wave method, an infrared method, an electromagnetic induction method, and an electrostatic capacitance method, and the like, and any method may be adopted.

The speech section 230 includes a speaker 231 and a microphone 232. The speech section 230 is able to convert a sound of a user, which is input through the microphone 232, into sound data, which can be processed in the main control section 200, and output the data to the main control section 200, and decodes sound data, which is received by the wireless communication section 210 or the external input/output section 260, and outputs the data from the speaker 231. Further, as shown in FIG. 21, for example, the speaker 231 can be mounted on the same surface as the surface on which the display input section 220 is provided. In addition, the microphone 232 can be mounted on a side surface of the housing 202.

The operation section 240 is a hardware key using a key switch or the like, and receives an instruction from a user. For example, as shown in FIG. 21, the operation sections 240 are button type switches which are mounted on the side surface of the housing 202 of the smartphone 201. Each switch is turned on if it is pressed by a finger or the like, and is turned off due to a restoring force of a spring if the finger is released.

The storage section 250 stores a control program and control data of the main control section 200, application software, address data in which names, phone numbers, and the like of communication partners are associated, received and transmitted e-mail data, web data which is downloaded by web browsing, and downloaded contents data, and temporarily stores streaming data and the like. Further, the storage section 250 is constituted of an internal storage portion 251, which is built into the smartphone, and an external storage portion 252 which has a removable external memory slot. In addition, each of the internal storage portion 251 and the external storage portion 252 constituting the storage section 250 is implemented by using a storage medium such as a flash memory type, a hard disk type, a multimedia card micro type, a card type memory (such as a Micro SD (registered trademark) memory), a random access memory (RAM), or a read only memory (ROM).

The external input/output section 260 has a function of an interface with all external devices connected to the smartphone 201. The external input/output section 260 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultrawideband (UWB) (registered trademark), and ZigBee (registered trademark)), or the like.

Examples of the external devices connected to the smartphone 201 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, earphones, and the like. The external input/output section is able to transfer the data, which is transmitted from such external devices, to the components within the smartphone 201, and to transmit the data within the smartphone 201 to the external devices.

The GPS receiver 270 receives a plurality of GPS signals, which are transmitted from GPS satellites ST1 to STn, in accordance with instructions of the main control section 200, executes positioning calculation processing based on the received GPS signals, and detects a position formed of a latitude, a longitude, and an altitude of the smartphone 201. The GPS receiver 270 may detect the position by using position information when it is possible to acquire the position information from the wireless communication section 210 or the external input/output section 260 (for example, wireless LAN).

The motion sensor section 280 includes, for example, a triaxial acceleration sensor, and detects physical movement of the smartphone 201, in accordance with an instruction of the main control section 200. By detecting physical movement of the smartphone 201, an acceleration and a direction of the movement of the smartphone 201 are detected. Such a detection result is output to the main control section 200.

The power supply section 290 supplies the respective sections of the smartphone 201 with electric power, which is stored in a battery (not shown), in accordance with an instruction of the main control section 200.

The main control section 200 includes a micro processor, and integrally controls the respective sections of the smartphone 201 by performing an operation on the basis of control data or a control program stored in the storage section 250. Further, the main control section 200 has an application processing function and a mobile communication control function of controlling the respective sections of a communication system in order to perform data communication and sound communication through the wireless communication section 210.

The application processing function is implemented by an operation of the main control section 200 using application software stored in the storage section 250. Examples of the application processing function include: an infrared communication function of performing data communication with other devices by controlling the external input/output section 260; an e-mail function of transmitting and receiving e-mails; a web browsing function of browsing web pages; and the like.

Further, the main control section 200 has an image processing function of displaying a video on the display input section 220 and the like, on the basis of image data (still image and moving image data) such as received data and downloaded streaming data. The image processing function means a function of causing the main control section 200 to decode the image data, apply image processing to the corresponding decoding result, and display an image on the display input section 220.

Further, the main control section 200 executes display control for the display panel 221 and operation detection control to detect the user operation through the operation sections 240 and the operation panel 222.

Through execution of the display control, the main control section 200 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 221.

Further, through execution of the operation detection control, the main control section 200 detects the user operation performed through the operation section 240, receives an operation performed on the icon or a text input performed in an input field of the window through the operation panel 222, or receives a request to scroll a displayed image through the scroll bar.

Furthermore, the main control section 200 has a touch panel control function performed through execution of the operation detection control. The function determines whether the operation position of the operation panel 222 is in the overlapping part (display region) which overlaps with the display panel 221 or the other part (non-display region) at the outer edge which does not overlap with the display panel 221, and controls the display position of the software key or the sensing region of the operation panel 222.

In addition, the main control section 200 may detect a gesture operation performed on the operation panel 222, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 241 is a digital camera for performing electronic photography by using an imaging element such as a complementary metal oxide semiconductor (CMOS) or a charge-coupled device (CCD). Further, the camera section 241 is able to convert image data, which is obtained through image capturing, into compressed image data such as data of a joint photographic coding experts group (JPEG) under control of the main control section 200, and to record the data in the storage section 250 or to output the data through the external input/output section 260 or the wireless communication section 210. As shown in FIG. 21, in the smartphone 201 the camera section 241 is mounted on the same side as the display input section 220. However, the mounting position of the camera section 241 is not limited to this. The camera section 241 may be mounted on the rear side of the display input section 220, or a plurality of camera sections 241 may be mounted. In addition, in the case where the plurality of camera sections 241 is mounted, photography may be performed using a single camera section 241 by selecting the camera section 241 for the photography, or photography may be performed using the plurality of camera sections 241 at the same time.

Further, the camera section 241 can be used in various functions of the smartphone 201. For example, an image, which is acquired by the camera section 241, can be displayed on the display panel 221, and an image of the camera section 241 can be used for one of the operation inputs of the operation panel 222. Further, when the GPS receiver 270 detects a position, the GPS receiver 270 may detect the position with reference to the image acquired from the camera section 241. Furthermore, it may be possible to determine a direction of an optical axis of the camera section 241 of the smartphone 201 or determine a current user environment, using the GPS receiver 270 in a combination with the triaxial acceleration sensor or without using the triaxial acceleration sensor, with reference to the image acquired from the camera section 241. Needless to say, the image acquired from the camera section 241 may be used in the application software.

Otherwise, the position information acquired by the GPS receiver 270, the sound information acquired by the microphone 232 (or text information obtained through sound text conversion performed by the main control section or the like), the posture information acquired by the motion sensor section 280, and the like may be added to the image data of the still image or the moving image, and the image data may be recorded in the storage section 250, and may be output through the external input/output section 260 or the wireless communication section 210.

In the above-mentioned smartphone 201, the above-mentioned processing sections relating to the restoration processing can be appropriately implemented by, for example, the main control section 200, the storage section 250, and the like.

It is apparent that the present invention is not limited to the above-mentioned embodiments, and may be modified into various forms without departing from the scope of the present invention.

EXPLANATION OF REFERENCES

10: digital camera
11: imaging section
12: optical system
14: camera main body
16: lens
17: aperture stop
18: optical system operation section
20: optical system controller
22: optical system input/output section
26: imaging element
28: camera main body controller
30: camera main body input/output section
32: input/output interface 33: display section
34: device control section
35: image processing section
36: restoration processing section
37: user interface
60: computer
62: computer input/output section
64: computer controller
66: display
70: the Internet
80: server
82: server input/output section
84: server controller
100: image adjustment section
105: restoration processing execution section
110: restoration strength adjustment section
115: subject distance acquisition section
120: movement amount acquisition section
125: restoration processing determination section
130: filter acquisition section
140: auto focus section
145: tracking auto focus determination section
150: frame rate setting section
155: blurred image correction processing section
200: main control section
201: smartphone
202: housing
210: wireless communication section
220: display input section
221: display panel
222: operation panel
230: speech section
231: speaker
232: microphone
240: operation section
241: camera section
250: storage section
251: internal storage section
252: external storage section
260: external input/output section
270: GPS receiver
280: motion sensor section
290: power supply section

What is claimed is:

1. An imaging device comprising:

an imaging circuit that generates a plurality of successive images of a subject captured through an optical system;

a frame rate setting circuit that sets a frame rate for generation of the images performed by an image sensor;

a filter acquisition circuit that acquires a restoration filter generated corresponding to a transfer function for point distribution of the optical system;

a restoration processing determination circuit that determines whether a restoration processing should be performed on the plurality of successive images through the restoration filter with the general restoration strength, a restoration strength of the restoration processing should be adjusted and the restoration processing should be performed on the plurality of successive images, or the restoration processing should not be performed on the plurality of successive images, on the basis of the frame rate which is set by the frame rate setting circuit;

a restoration strength adjustment circuit that adjusts the restoration strength of the restoration processing in case where the restoration processing determination circuit determines that the restoration strength of the restoration processing should be adjusted and the restoration processing should be performed on the plurality of successive images; and a restoration processing execution circuit that performs the restoration processing on the plurality of successive images through the restoration filter with the general restoration strength or with the adjusted restoration strength, on the basis of the determination of the restoration processing determination circuit.

2. An imaging method comprising:

a generation step of generating a plurality of successive images of a subject captured through an optical system;

a frame rate setting step of setting a frame rate for generation of the plurality of successive images performed in the generation step;

a filter acquisition step of acquiring a restoration filter generated corresponding to a transfer function for point distribution of the optical system;

a restoration processing determination step of determining whether a restoration processing should be performed on the plurality of successive images through the restoration filter with the general restoration strength, a restoration strength of the restoration processing should be adjusted and the restoration processing should be performed on the plurality of successive images, or the restoration processing should not be performed on the plurality of successive images, on the basis of the frame rate which is set in the frame rate setting step;

a restoration strength adjustment step of adjusting the restoration strength of the restoration processing in case where it is determined in the restoration processing determination step that the restoration strength of the restoration processing should be adjusted and the restoration processing should be performed on the plurality of successive images; and a restoration processing execution step of performing the restoration processing on the plurality of successive images through the restoration filter with the general restoration strength or with the adjusted restoration strength, on the basis of the determination in the restoration processing determination step.

* * * * *